(12) United States Patent
Jakobson et al.

(10) Patent No.: US 9,449,333 B2
(45) Date of Patent: *Sep. 20, 2016

(54) ONLINE ADVERTISING ASSOCIATED WITH ELECTRONIC MAPPING SYSTEMS

(71) Applicants: Gabriel Jakobson, Sammamish, WA (US); Steven Rueben, Las Vegas, NV (US)

(72) Inventors: Gabriel Jakobson, Sammamish, WA (US); Steven Rueben, Las Vegas, NV (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/986,744

(22) Filed: May 31, 2013

(65) Prior Publication Data

US 2014/0359537 A1    Dec. 4, 2014

Related U.S. Application Data

(63) Continuation-in-part of application No. 12/592,894, filed on Dec. 2, 2009, now Pat. No. 8,490,025, which is a continuation-in-part of application No. 12/012,353, filed on Feb. 1, 2008, now Pat. No. 8,504,945.

(51) Int. Cl.
| | |
|---|---|
| *G06F 3/048* | (2013.01) |
| *G06Q 30/02* | (2012.01) |
| *G01C 21/36* | (2006.01) |
| *G09B 29/00* | (2006.01) |
| *G09B 29/10* | (2006.01) |

(52) U.S. Cl.
CPC ....... *G06Q 30/0261* (2013.01); *G01C 21/3682* (2013.01); *G01C 21/3697* (2013.01); *G09B 29/006* (2013.01); *G09B 29/106* (2013.01)

(58) Field of Classification Search
None
See application file for complete search history.

(56) References Cited

U.S. PATENT DOCUMENTS

| | | | |
|---|---|---|---|
| 2008/0068380 A1* | 3/2008 | McAvoy et al. | 345/428 |
| 2008/0162534 A1* | 7/2008 | Muhonen et al. | 707/102 |
| 2009/0198607 A1* | 8/2009 | Badger et al. | 705/37 |
| 2010/0211453 A1* | 8/2010 | Huang | 705/14.39 |
| 2011/0313859 A1* | 12/2011 | Stillwell et al. | 705/14.58 |

* cited by examiner

*Primary Examiner* — Kenny Lin

(57) ABSTRACT

Various methods, systems and apparatus for displaying online advertising content associated with a point-of-interest ("POI") in a digital mapping system, are disclosed. One such method may include detecting a change in the zoom level of an electronic map displayed on a computing device (e.g. desktop/laptop, smart phone, etc. operation on Windows®, Linux®, Mac OS®, iOS®, Android®, etc.) determining if the new zoom-level is at a pre-determined zoom level (e.g. at maximum zoom), identifying a POI on the map, retrieving advertisement content associated with the POI ("POI advertisement content") and displaying the POI advertisement content. A POI may be a specific point of interest; or, an entire geographic region of a map displayed at a high zoom level. The method may further include detecting a change in the zoom, or pan, of the digital map while POI advertisement content is displayed, and removing or repositioning the POI advertisement content in response.

31 Claims, 29 Drawing Sheets

ONLINE ADVERTISING ASSOCIATED WITH ELECTRONIC MAPPING SYSTEMS

RELATED U.S. APPLICATION DATA

This application is a continuation-in-part of, and claims priority to, U.S. patent application Ser. No. 12/592,894 filed on Dec. 3, 2009 titled "Displaying Content Associated with Electronic Mapping Systems" and U.S. patent application Ser. No. 12/012,353 filed on Feb. 1, 2008, titled "Method and System for Associating Content with Map Zoom Function". The disclosure of the prior applications is considered part of and is incorporated by reference in the disclosure of this application.

FIELD OF INVENTION

The present invention generally relates to mapping on electronic devices. More particularly, the present invention relates to associating online-advertising content pertaining to a point-of-interest, or to a visible portion of an electronic map, and displaying the content in response to a change in the electronic map's zoom level.

BACKGROUND OF THE INVENTION

Popular mapping services include Google Maps®, Yahoo! Maps®, Windows Live Search Maps®, MapQuest® and others. Mapping services are typically available to a user through a web browser, running on a computer or a portable electronic device, such a cellular/smart phone (e.g. Apple iPhone®, Android®-based smart phone, etc.) personal digital assistant, etc. Mapping services allow a user to view a map in various formats (e.g. 2D, 3D, aerial, road, streetview, etc.). Functionality provided includes "zoom in" and "zoom out", which allows the user to see a smaller region at a greater level of detail, and larger region in less detail, respectively. Zooming in and out is often accomplished with the help of a control (e.g. a graphic control) which the user can manipulate with an input device such as a mouse, keyboard, stylus, by touch, etc. Zooming-in may be limited by settings defining minimum/maximum zoom levels, and/or by the physical limitation of zoom data available. For example, urban areas are often available for zoom up to the maximum "street level" (i.e. one or more streets with individual buildings are clearly visible) whereas remote areas may be available for zooming at a lower maximum level. Online advertising, also known as online advertisement, internet marketing, online marketing or e-marketing, is the marketing and promotion of products or services over the Internet. Examples of online advertising include contextual ads on search engine results pages, banner ads, blogs, rich media ads, social network advertising, interstitial ads, online classified advertising, advertising networks, dynamic banner ads, cross-platform ads and e-mail marketing, including e-mail spam. Many of these types of ads are delivered by an ad server.

SUMMARY OF THE INVENTION

The present invention provides various methods, systems and apparatus for displaying advertisement content associated with a point-of-interest ("POI") in a digital mapping system. In response to a "zoom in" command received by a map-display application, displaying a selected area of the map at a magnification beyond a predetermined zoom level, advertisement content associated with a POI on the map ("POI advertisement content") may be retrieved and displayed. In one embodiment, POI advertisement content may be retrieved from a data store containing various POI advertisement content for multiple POIs. In another embodiment, POI advertisement content may be derived from a website associated with the POI, through an automated process. POI advertisement content may be in the form of media (a photograph, audio, video, etc.). POI advertisement content may be associated with a region of a displayed-area of a map, the region collectively being considered a POI.

In one embodiment, POI advertisement content may be displayed overlaying a portion of the map allowing some parts of the map to remain visible. In another embodiment the POI advertisement content may replace the map or overlay its entirety. In response to various commands (e.g. zoom out, pan, etc.) the POI advertisement content may be hidden from view, restoring the map to its visual state prior to the POI advertisement content having been displayed. POI advertisement content may include images, media, web content, KML (for Keyhole Markup Language) files, documents, etc.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1A:
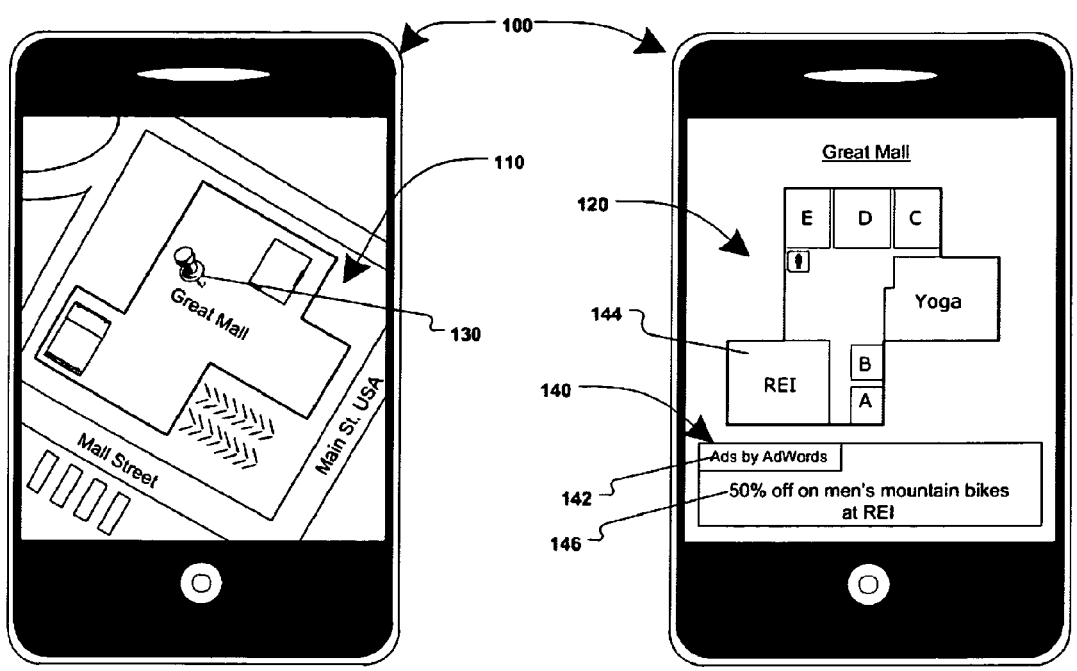
FIGS. 1A and 1B are generalized block diagrams illustrating the transformation of a digital map into POI-related advertising content, in response to a zoom-in functions, according to two possible embodiments of the present invention.
Figure 1B:
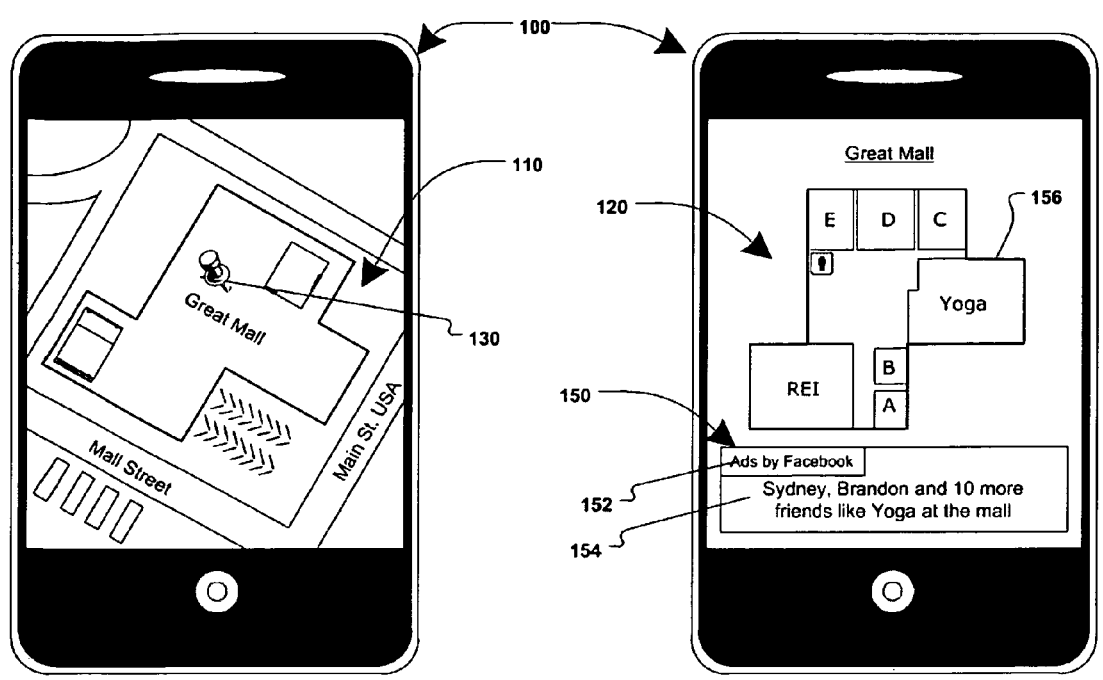

FIGS. 1A and 1B are generalized block diagrams illustrating the transformation of a digital map into POI-related advertising content, in response to a zoom-in functions, according to two possible embodiments of the present invention. Referring to FIG. 1A, Electronic device 100 (e.g. a smart phone, PC etc.) may display a digital map 110. Digital map 110 may be generated by a mapping service (e.g. Google Maps®, Yahoo! Maps®, Windows Live Search Maps®, etc.) and may be transmitted to electronic device 100 electronically (e.g. via the internet, wirelessly, using cellular communication, etc.)

Map 110 may be generated and displayed by computer code (e.g. using technologies such as AJAX, javascript, http requests, DHTML, XML, VML, Flash®, etc.) in a map-display application (e.g. a browser application.) Map 110 may be composed of graphical images, known as "map tiles", that may be received by the client device 100 from the mapping service, and assembled and displayed as a map 110. Images (e.g. a location marker 130, pictures, icons, Flash® media files, etc.) may be generated by the mapping service as graphics (e.g. "PNG" or "GIF" files) and transmitted to the electronic device 100 to be displayed on map 110.

Map 110 may display points of interest. A point-of-interest ("POI") may be designated by a location marker 130. A POI may be generated in multiple ways. A POI may be selected by the user (e.g. by touching the screen, using a pointing device, etc.) A POI may correspond to a physical address or landmark. In yet another possible embodiment, a POI may comprise an area of a map. For example, in a case where a map at the highest zoom level displaying one or more houses, the houses—or a visible segment of a street where the houses are—may be collectively considered a POI. A POI may be designated by the mapping service providing map 110. For example, the mapping service may generate/designate a POI in response to a user query (e.g. the user may enter a search query such as "shopping mall" and the mapping service may mark one or more shopping malls on map 110 as POIs.)

In the presently-preferred embodiment, a POI may also be designated implicitly—for example, when a map 110 is displayed in the highest zoom level, a landmark most prominent (e.g. occupying largest area of the map) may automatically be designated a POI. In an alternate embodiment, a landmark closest to the center of the map 110 may be automatically designated a POI. In yet another embodiment, a landmark closest to the center of the map 110—with which the mapping service has associated information, may automatically be designated a POI.

Map 110 may be manipulated by the user of electronic device 100. For example, the user may use a control and/or pointing device (e.g. stylus, fingers touching the screen, mechanical/electronic controls, etc.) to pan across or zoom into a map 110.

A map is commonly capable of being displayed in various zoom levels. In response to a user's selecting a zoom level, the map-display application may determine the new region to be displayed, request the corresponding map tiles from the mapping service, and display the received map tiles over the previous map tiles, which were displayed at the previous zoom level.

Zooming is generally supported within limits. A zoom-level may be designated by a number—for example, in the range of "0"-"20", where "20" may represent the highest-supported zoom level and "0" may be the lowest supported zoom level. For example, zoom level "0" may show a view of Planet Earth, while zoom-level "10" may show a map view of the area equivalent to an average State; zoom-level "15" may show a map of a city and the highest zoom level, "20", may show one or more streets and/or a large building.

At present, integers denoting a zoom level may be arbitrary and change over time. Zoom levels may be correlated to a physical scale. For example, a zoom level of 0 may correspond to a map scale of 1 inch=20,000 miles. A zoom level of 10 might be 1 inch=200 miles, 15 can correspond to 1 inch=20 miles, 20 might be 1 inch=200 yards, etc.

In the most common implementations of mapping technology, at present, a user attempting to zoom-in past the highest zoom-level (i.e. the map is displayed at the highest zoom-level, example "20", and the user attempts to further zoom in), may be displayed one of two things: in some cases, the display may remain unchanged (with an occasional accompaniment of an audible signal, e.g. a "beep" sound) to indicate to the user no further zooming is available. In another common implementation, new map tiles are displayed indicating to the user no map image is available in the current zoom level. In accordance with applicant's previous invention publications Ser. No. 12/592,894 and Ser. No. 12/012,353 additional content 120 may be displayed in response to reaching the highest zoom level.

In one presently-preferred embodiment, advertising content 140 ("POI advertisement content") associated with a POI on the map 110 (e.g. a POI demarked by location marker 130), may be displayed in electronic device 100 in response to a request to zoom-in while the current zoom-level is at a pre-determined maximum. The POI advertisement content 140 may be from a service such as Google Ad Words® 142, wherein the content of the POI advertisement content 140 may include advertising contextual to the POI 130. (e.g. an advertisement such as "50% off on men's mountain bikes at REI" 146, matching search criteria set by Google®'s ad-engine, in this example displaying the ad 140 associated with sport store REI 144 as the latter is included in geographic proximity to the location marker 130.)

In an alternate embodiment, POI advertisement content 140 may be displayed in response to a request to zoom to the highest zoom level (i.e. in this alternate embodiment, POI advertisement content may be displayed at a zoom level where map data may still be available.)

In yet another alternate embodiment, POI advertisement content 140 may be displayed in response to a request to zoom to a pre-determined zoom level. Pre-determined zoom levels may be set by a user, may be default settings, may be set dynamically based on POI-content provider preferences, etc.

In yet another possible alternate embodiment, referring now to FIG. 1B, social-network advertising 150 (e.g. "Ads by Facebook®" 152) may be displayed in response to reaching a maximum zoom level for the map 110. In response to a user's zooming to a map's maximum zoom level, a social-network advertisement engine may produce an advertisement related to a user of the electronic device 100, deriving data from the user's social graph and/or any geographic content on the map 110. For example, the social-network advertisement 150 may read "Sydney, Brandon and 10 more friends like Yoga at the mall" 154, wherein the "Yoga" reference may be related to a Yoga studio 156 located in proximity to the location market 130 (FIG. 1A).

FIGS. 2A, 2B, 2C and 2D are general block diagrams illustrating various map images and content, displayed in response to changes in zoom levels, according to one embodiment of the present invention. FIGS. 2A-2D illustrate an electronic device 200 (e.g. a personal computer, smart phone, PDA, etc.)

Electronic device 200 may include a map-display application 202 (e.g. a browser, an application capable of displaying a map generated by a remote mapping service, etc.) In the presently-preferred embodiment, map-display application 202 may support the display of various map types and images, including graphical images extraneous to maps generated by a mapping service.

Figure 2A:
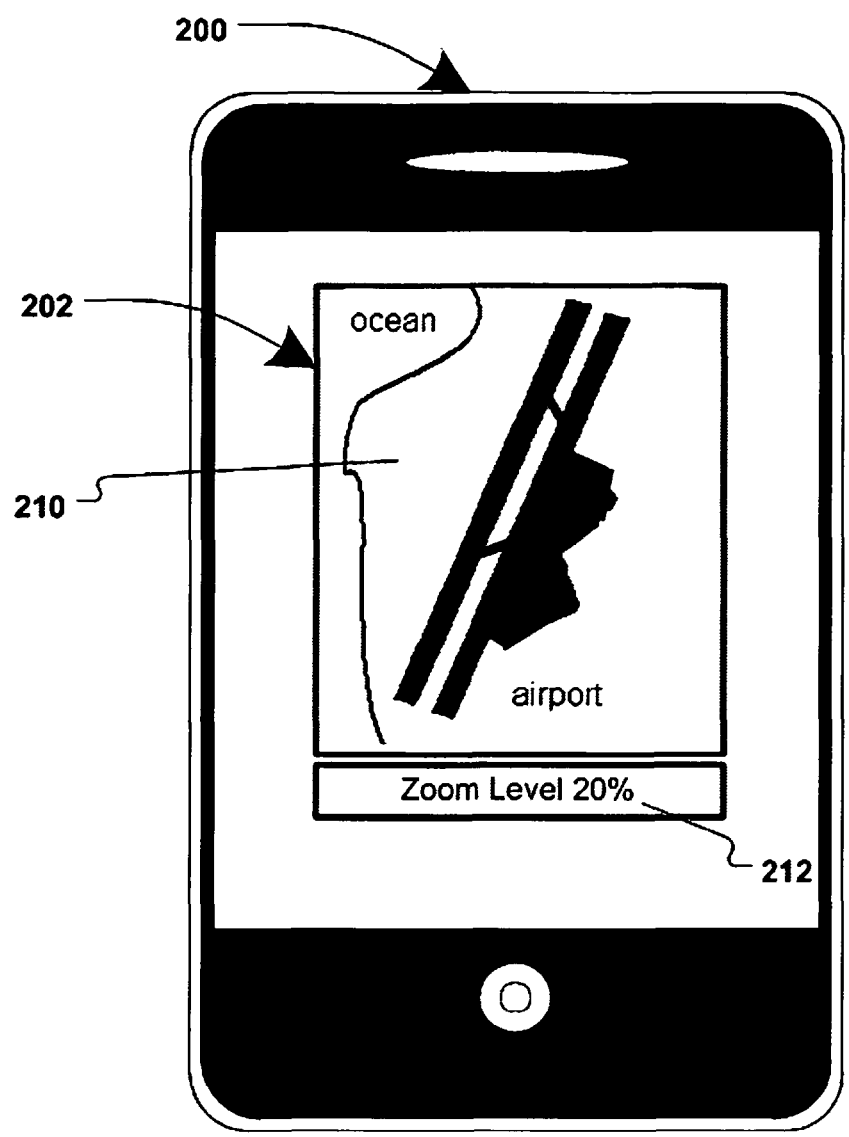
FIGS. 2A, 2B, 2C and 2D are general block diagrams illustrating various map images and content, displayed in response to changes in zoom levels, according to one embodiment of the present invention.

Referring to FIG. 2A, a map 210 may be displayed in map-display application 202. Map 210 may be displayed at various zoom levels. For example, zoom-level indicator 212 may indicate a zoom level of "20%" In this example, map 210 is displayed in a satellite image/hybrid map format, for illustrative purposes only—the present invention supports any type of map format (e.g. a 2D map, a 3D map, an aerial map, a hybrid map, a road map, etc.)

Figure 2B:
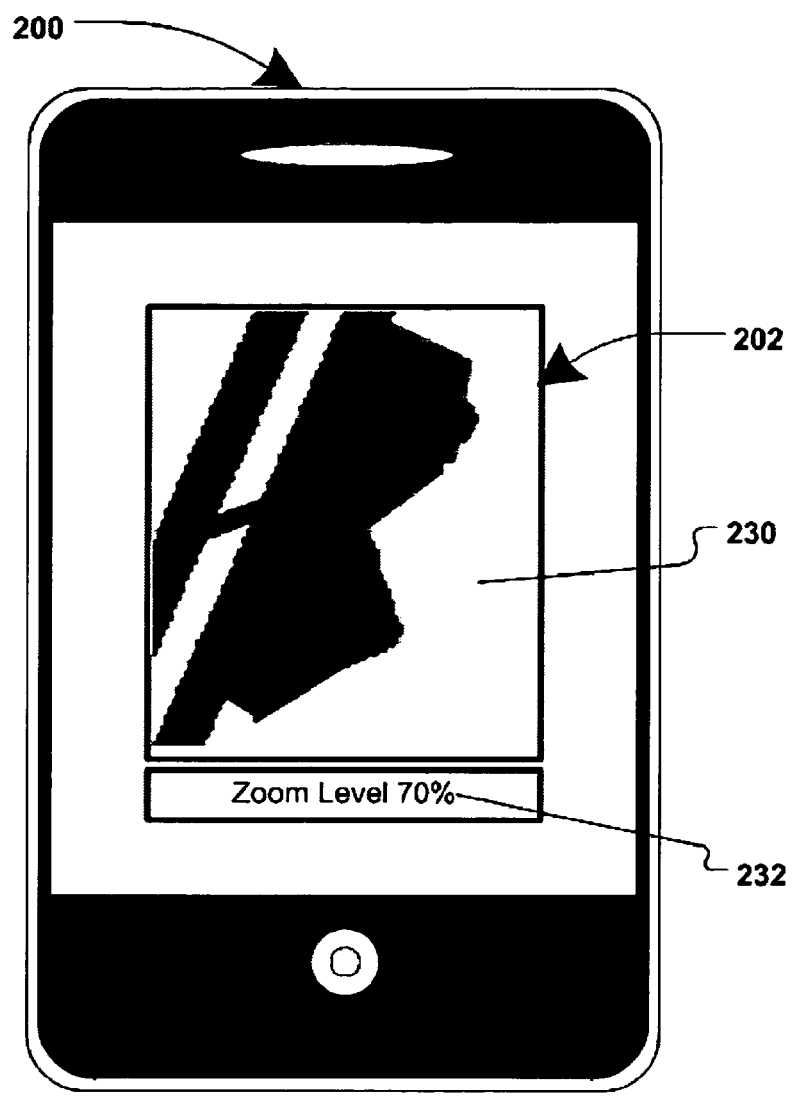

Referring now to FIG. 2B, map-display application 202 displays a map on device 200. In this example, zoom-level indicator 232 may display "Zoom Level 70%". Accordingly, the reader will notice that map 230 is displayed at a higher zoom level than map 210 in FIG. 2A. (i.e. the word "ocean", an entire airport perimeter and the word "airport" are visible in map 210, whereas only a portion of the airport, appearing larger, is visible in map 230.) The user may have used various controls to issue a command to increase the zoom level (e.g. controls such as keyboard, touch screen, mouse, stylus, voice command, etc.)

Figure 2C:
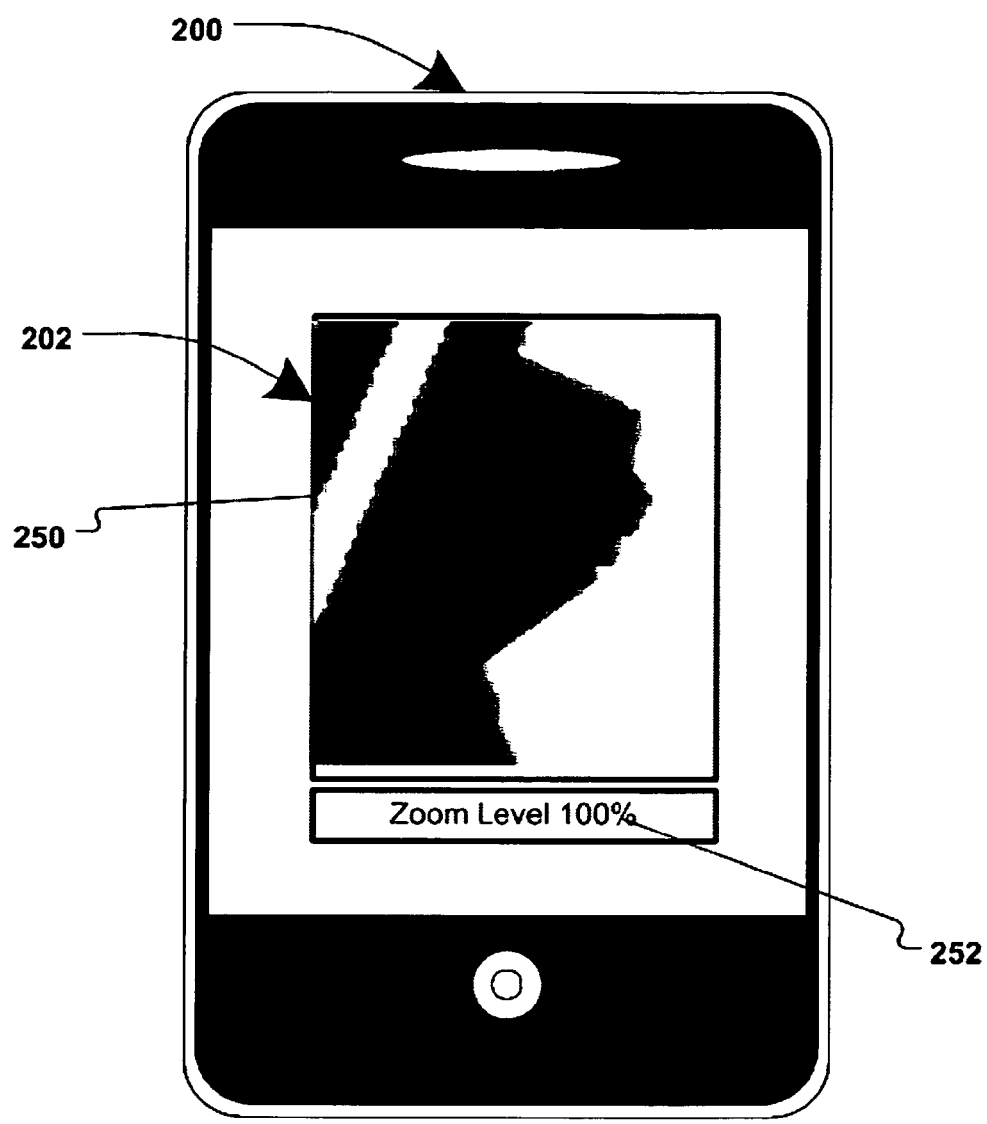

Referring now to FIG. 2C, zoom-level indicator 252 may read "Zoom level 100%". Accordingly, map 250, displayed in map-display application 202 on device 200, may be displayed at the highest-possible zoom level (i.e. a small portion of the airport image in map 210 is displayed over the same screen area as map 210, allowing for a greater level of detail to show.)

In map-display application 202, illustrated in FIGS. 2A-2C, a zoom level may change in response to a user's input (e.g. via an input device such as a mouse, stylus, touching a touch-screen, mechanical control, keyboard, etc.), in accordance with the common operation of mapping systems in the prior art domain. Sequential user input, interpreted as a commands to increase the zoom level, may cause the zoom level to increase in a sequence, as illustrated in FIGS. 2A, 2B and 2C (FIG. 2A illustrates map 210 at zoom level 20%, FIG. 2B illustrates a map 230 at zoom level 70%, FIG. 2C illustrates a map at zoom level 100%.)

In all presently-existing prior art, a user's input command to increase the zoom level of the map beyond the maximum-supported zoom level (i.e. map-zoom level is 100% prior to user's invoking a command to zoom-in), does not display additional mapping information or content associated with POIs on the map.

Figure 2D:
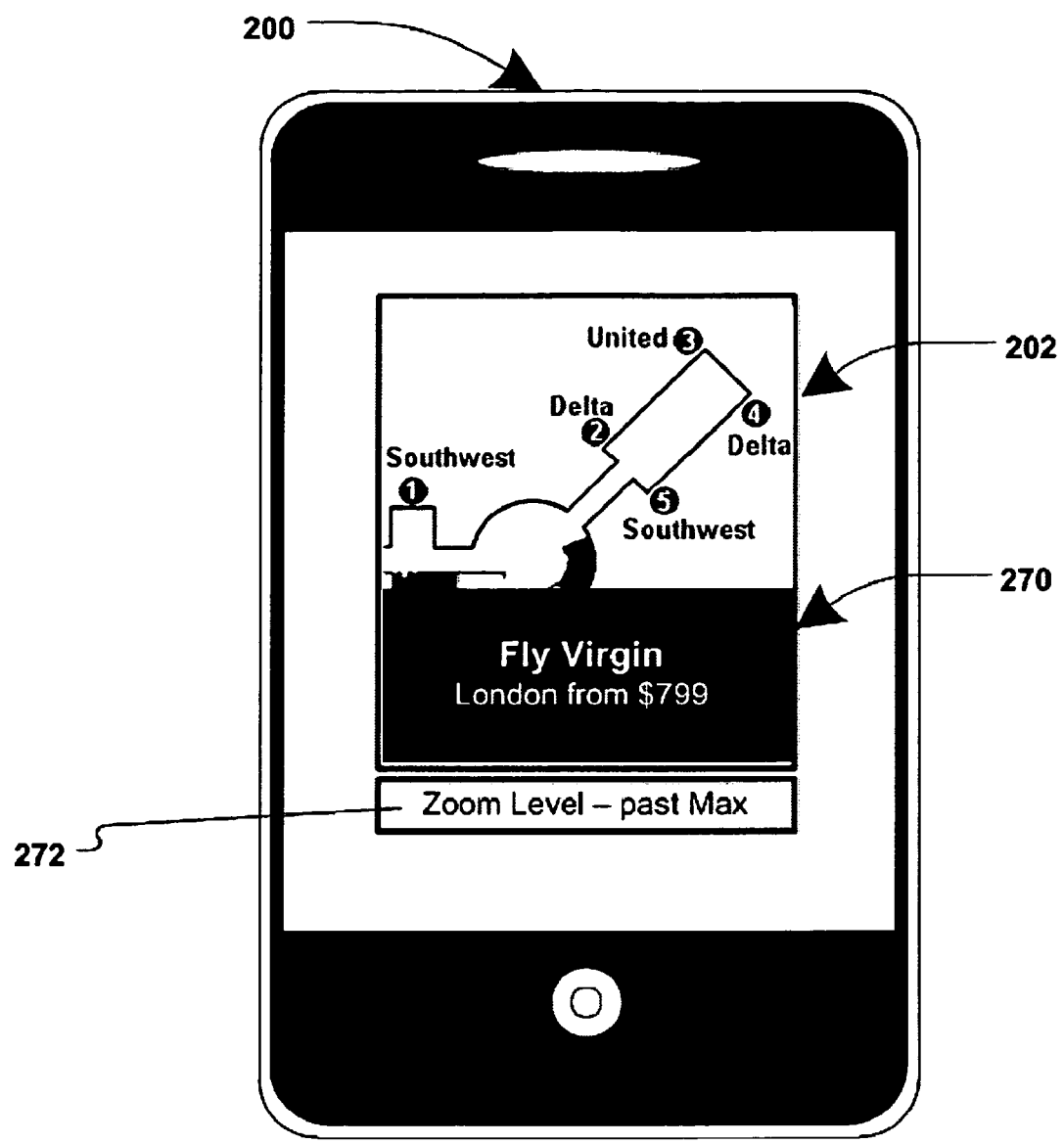

Referring now to FIG. 2D, in the presently-preferred embodiment, additional content may be displayed in response to the user's invoking a zoom-in command past the highest-supported zoom level. Map-display application 202, on electronic device 200, may display content associated with a POI on the map ("POI advertisement content") 270.

In the presently-preferred embodiment, POI advertisement content 270 may be content associated with a POI most prominent on the map which is displayed at the highest-zoom level (e.g. map 250 in FIG. 2C) In alternate embodiments, as will be shown in later figures, various other methods may be used to determine a POI whose associated POI advertisement content may be displayed.

In this example, POI advertisement content 270 (e.g. an airline ad, as in "Fly Virgin, London from $799"), displayed in map-display application 202, may be associated with the airport in maps 210, 230 and 250 in FIGS. 2A, 2B and 2C, respectively. While maps 210, 230 and 250 may be satellite images of an airport—with map 250, labeled "Zoom level 100%" 252—displaying the highest-resolution map (e.g. image of the airport terminal), POI advertisement content 270, at a zoom level labeled "Zoom level—past Max" (for illustrative purposes) 272, may display advertisement from various ad engines/services such as Google AdWords®/AdSense®, Facebook® etc.

As will be discussed in later figures, POI advertisement content 270, which may be displayed when the user invokes a zoom-in command past the highest-available zoom level, may be an image, a website, Flash® content, PDF® content, any form of active content, etc.

In the presently-preferred embodiment, in a case where the area of map-display application 202 is relatively small (e.g. on the screen of a smart phone or PDA) POI advertisement content 270 may display in the entire display area of map-display application 202 (i.e. entirely obscuring the map 250 in FIG. 2C.) In alternate embodiments, as shown in other figures, POI advertisement content 270 may display overlaying map 250 (i.e. displayed "on top" of map 250 obscuring a portion of map 250.)

Figure 3A:
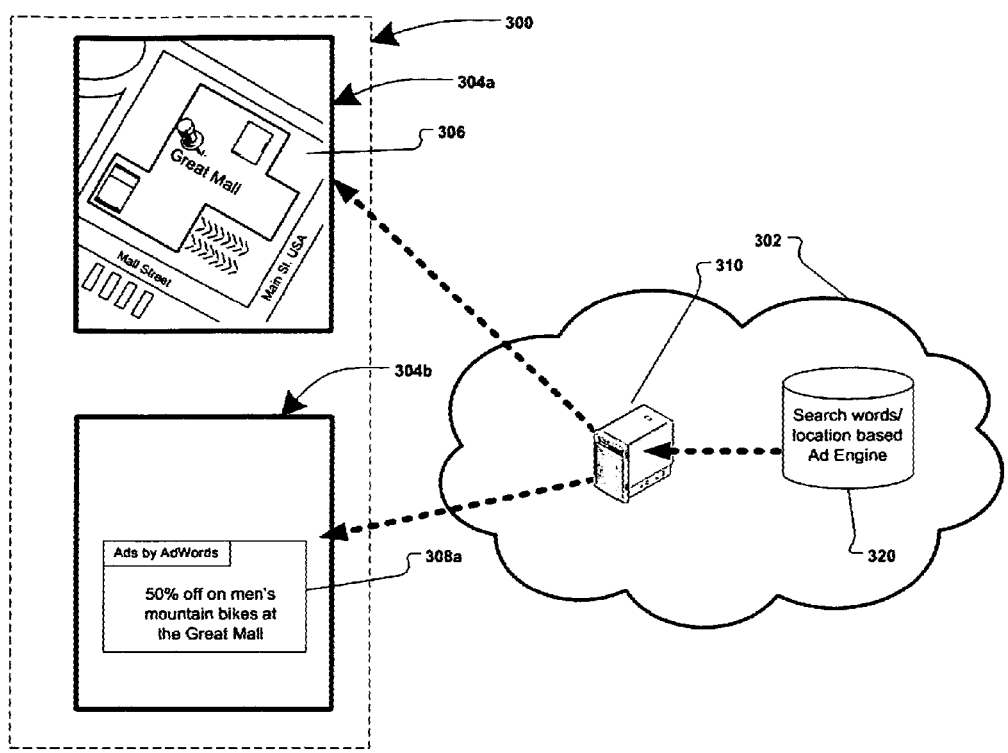
FIGS. 3A and 3B are generalized block diagrams illustrating rendering mapping and POI advertisement content on a user's electronic device, according to two possible embodiments of the present invention.
Figure 3B:
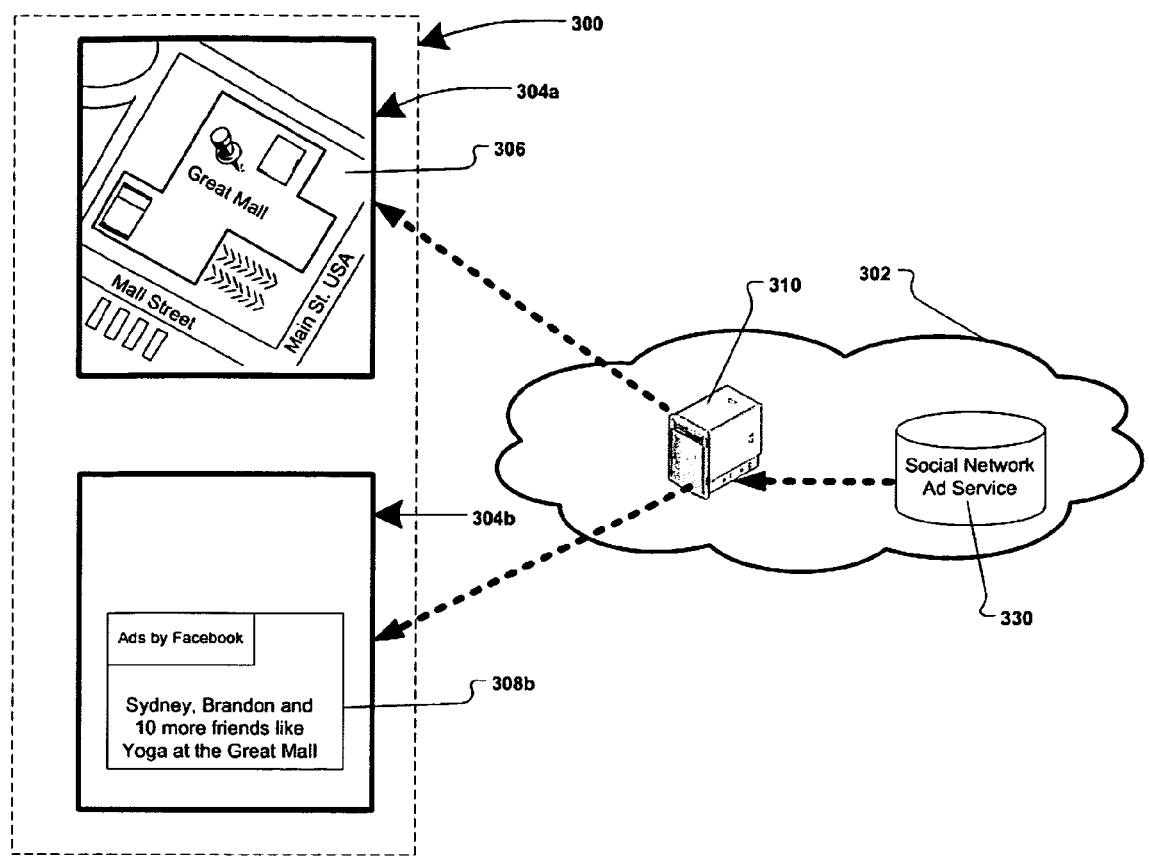

FIGS. 3A and 3B are generalized block diagrams illustrating rendering mapping and POI advertisement content on a user's electronic device, according to two possible embodiments of the present invention. FIG. 3A illustrates one possible embodiment, where a map-display application on the client's electronic device may request and display mapping information; and, when deemed necessary, may request and display POI advertisement content information based on ad-words and/or geo-location. FIG. 3B illustrates another possible embodiment, where a map-display application on the client's electronic device may request and display mapping information; and, when deemed necessary, may request and display social-network-generated POI advertisement content.

Please note that, both in FIGS. 3A and 3B, map-display applications 304a and 304b represent the same map-display application, in two different states: the map-display application is denoted as 304a when displaying a map, and as 304b when displaying POI advertisement content.

Referring to both FIGS. 3A and 3B, a user's electronic device 300 may communicate with a mapping server 310 over a network 302 (e.g. the world-wide web.) A map-display application 304a, running on user's electronic device 300, may receive mapping data from mapping server 310 and display the mapping data as a map 306. The mapping data may generally include mapping tiles—or images—which map-display application 304a may then display stitched together to form a map.

Map-display application 304a may receive input from the user (e.g. pan, zoom, new locations/coordinate to display, etc.) In response to the user input, map-display application 304a may request mapping information from mapping server 310 and display the received mapping information.

Please note that it is common practice for map-display applications to use caching to store various mapping data. Once mapping data is received from the mapping server for the first time, it may be stored in local cache. Subsequent request for the same data may receive the data from local cache and not from the mapping server. Since caching is out of scope for this discussion, we describe all data as transmitted from a server, disregarding the fact that in an actual implementation, some of the data may be retrieved from a local cache.

Referring now to FIG. 3A, in one presently-preferred embodiment, a map-display application on the client device may receive data (i.e. mapping data and various other data) from various sources and display the received data. For example, data used for rendering a map may be received from a mapping server, whereas other data, such as POI advertisement content, may be received from other offline and online sources. The map-display application may determine the sources from which to receive various types of data.

A map-display application 304a may obtain and display mapping data as map 306, from mapping server 310. POI advertisement content 308a may be obtained and displayed by the map-display application 304b, from search-words/location-based advertising data sources 320 (e.g. Google's AdWords® or any other source of advertisement which serves advertisement in connection with any search words associated with the map-display application 304a and/or physical location of the device 300 and/or location shown in the map 306) In this example, map-display application 304a may display mapping data as a map 306, showing a shopping center titled "Great Mall". In response to input requesting zooming-in past the highest-allowed zoom level, map-display application 304b may retrieve POI advertisement content from the search-words/location-based advertising data sources 320, and display the POI advertisement content 308a (in this example "50% off on men's mountain bikes at the Great Mall.")

Referring now to FIG. 3B, in another possible embodiment, a map-display application may display advertisements derived from a social network advertisement engine/service, in conjunction with zooming-in functionality. In this embodiment, user input (e.g. pan, zoom, inputted location name, etc.) may be transmitted by the map-display application 304a to a mapping server 310. Mapping server 310 may retrieve POI advertisement content, as needed, from a social-network advertisement service 330 (e.g. Facebook® advertising engine/service) and transmit back to map-display application 304b images containing POI advertisement content 308b.

A map-display application 304a may obtain and display mapping data as map 306, from mapping server 310, as discussed previously. Map-display application 304a may transmit user input to mapping server 310, in response to which mapping server 310 may construct and transmit back new display images. Mapping server 310, upon receiving from map-display application 304a a user request to zoom-in past the highest-allowed zoom level, may (1) obtain POI advertisement content from the social-network advertisement service 330, and (2) construct new display images containing POI advertisement content and (3) transmit the new images for display by the map-display application 304b as POI advertisement content 308b.

In this example, mapping server 310 may transmit to map-display application mapping data forming map 306, showing a shopping center titled "Great Mall". In response to input requesting zooming-in past the highest-allowed zoom level, mapping server 310 may obtain POI advertisement content from the social-network advertisement service 330 and transmit content containing the POI advertisement content to map-display application 304b for display as POI advertisement content 308b (e.g "Sydney, Brandon and 10 more friends like Yoga at the Great Mall.")

Figure 4A:
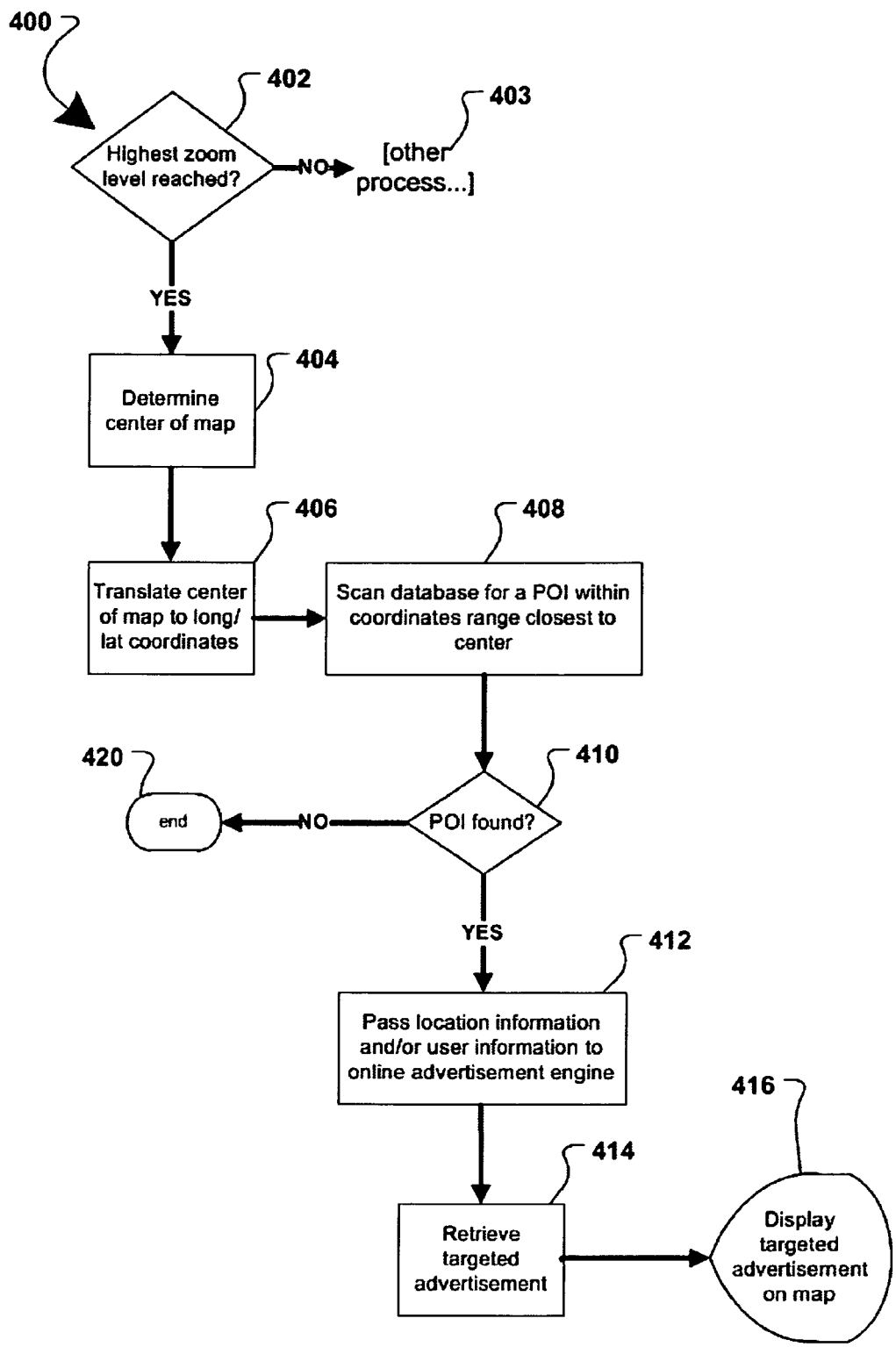
FIGS. 4A and 4B are generalized flow diagrams illustrating logic for determining and displaying POI advertisement content, according to other possible embodiments of the present invention.
Figure 4B:
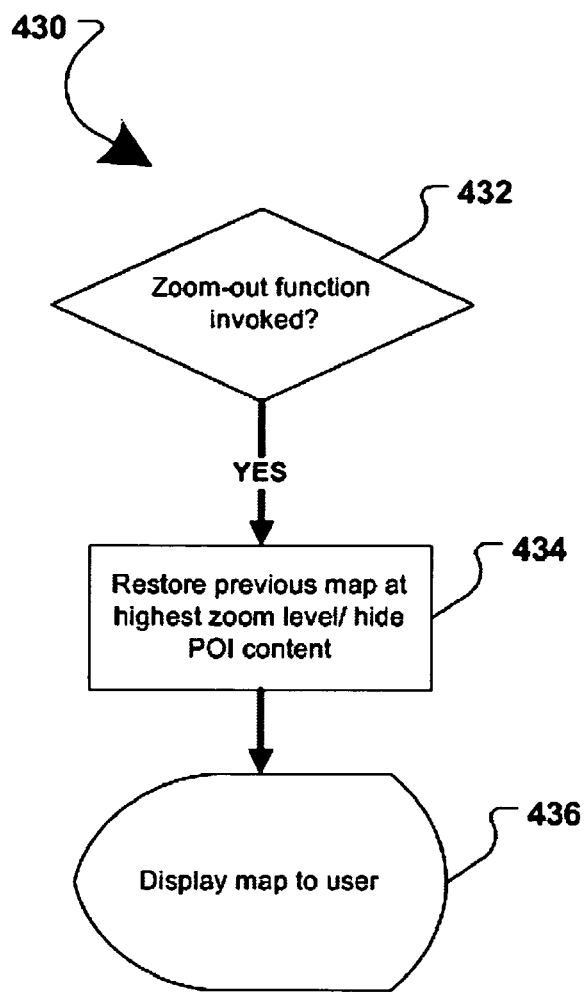

FIGS. 4A and 4B are generalized flow diagrams illustrating logic for determining and displaying POI advertisement content, according to other possible embodiments of the present invention. FIGS. 4A and 4B illustrate event-driven logic—i.e. various flows are invoked in response to events received, and generated by, a map-display application. Events related to mapping technologies and map-display applications are further discussed in FIGS. 12A-12D.

Referring to FIG. 4A, the logic in flow diagram 400 may be invoked by a zoom-in event (e.g. the map-display application receives user input invoking a zoom-in command.)

At step 402, it may be determined whether the highest-allowed zoom level has been reached prior to the zoom-in event. If it is determined that the highest-allowed zoom level has not been reached prior to the zoom-in event, at step 403 other logic (not depicted in this flow diagram as it is out-of-scope for this discussion) may be invoked.

If it is determined at step 402 that the highest-allowed zoom level has been reached prior to the zoom-in event, at step 404 the center of the map may be determined. A map is commonly displayed as tiled images representing a range of longitude/latitude values. The center of the map may be determined mathematically by calculating the mean horizontal display coordinate and mean vertical display coordinate.

At step 406, the center of the map, determined in display-coordinates at step 404, may be transformed into longitude/latitude coordinates.

Please note that the process of determining the center of a displayed map, in screen coordinates, and translating the screen coordinates into longitude/latitude values, is well established and is commonly used in prior art.

At step 408, a database of POIs may be scanned to determine if a POI matching the longitude/latitude coordinates determined at step 406, exists. For example, a POI database may include a list of POIs (e.g. shopping centers, airports, amusement parks, etc.), including the longitude/latitude coordinates of the POI.

At step 408, a list of all POIs within the coordinate range displayed on the map may be retrieved and, in the event more than one POI is determined to be within the coordinate range, the POI closest to the center coordinates, determined at step 406, may be selected.

If at step 410 it is determined that at least one matching POI has been found at step 408, at step 412 advertisement content association with the determined at step 408, may be retrieved from one or more advertising services, such as Google AdWords®, Facebook®, AdSense®, AdMob® etc. The advertising content may be related to one or more of: the POI at step 408 and/or one or more users and/or social connections of one or more users, and/or physical connection of the electronic device assumed in FIG. 4A.

At step 414, the advertisement content associated with the POI ("POI advertisement content"), retrieved at step 412, may be displayed by the map-display application. In the presently-preferred embodiment, the POI advertisement content may be displayed overlapping a part of—or the entirety of—the map displayed by the map-display application. In an alternate embodiment, the POI advertisement content may be displayed replacing the map previously displayed by the map-display application. In another embodiment, the POI advertisement content may be displayed externally to the map displayed by the map-display application.

If at step 410 it is determined that no POI has been found at step 408, at step 420 the flow may terminate. In alternate embodiments, at step 420 the user may be notified no POI has been found, for example audibly as in a "beep" sound, or via a message indicating no POI advertisement content is available, etc.

Referring now to FIG. 4B, flow diagram 430 may be invoked when a zoom event is received by the map-display application. If at step 432 it is determined that a "zoom-out" function has been invoked, at step 434 the POI advertisement content may be removed or hidden (depending on the POI advertisement content display-method used at step 414 in FIG. 4A.)

At step 436, the map ordinarily displayed at the highest-allowed zoom level, may be displayed to the user, unobstructed by POI advertisement content.

In alternate embodiments, as discussed in other figures, the logic of flow diagram 430 may be used in response to other events, such as a user panning the map, inputting a different geographic region to map, etc.

Figure 5A:
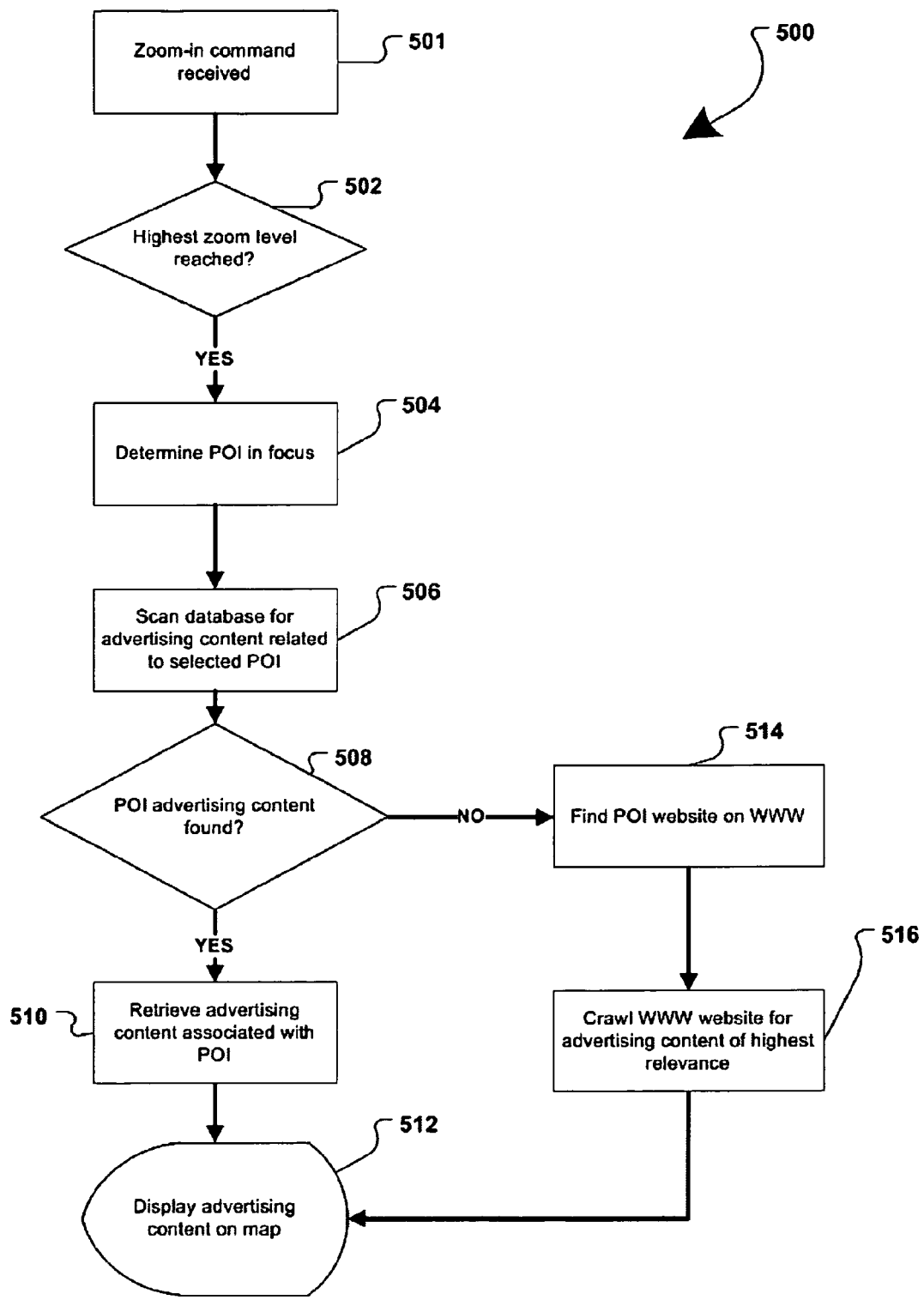
FIGS. 5A and 5B are generalized flow diagrams illustrating methodologies for retrieving POI advertisement content for display, according to various possible embodiments of the present invention.
Figure 5B:
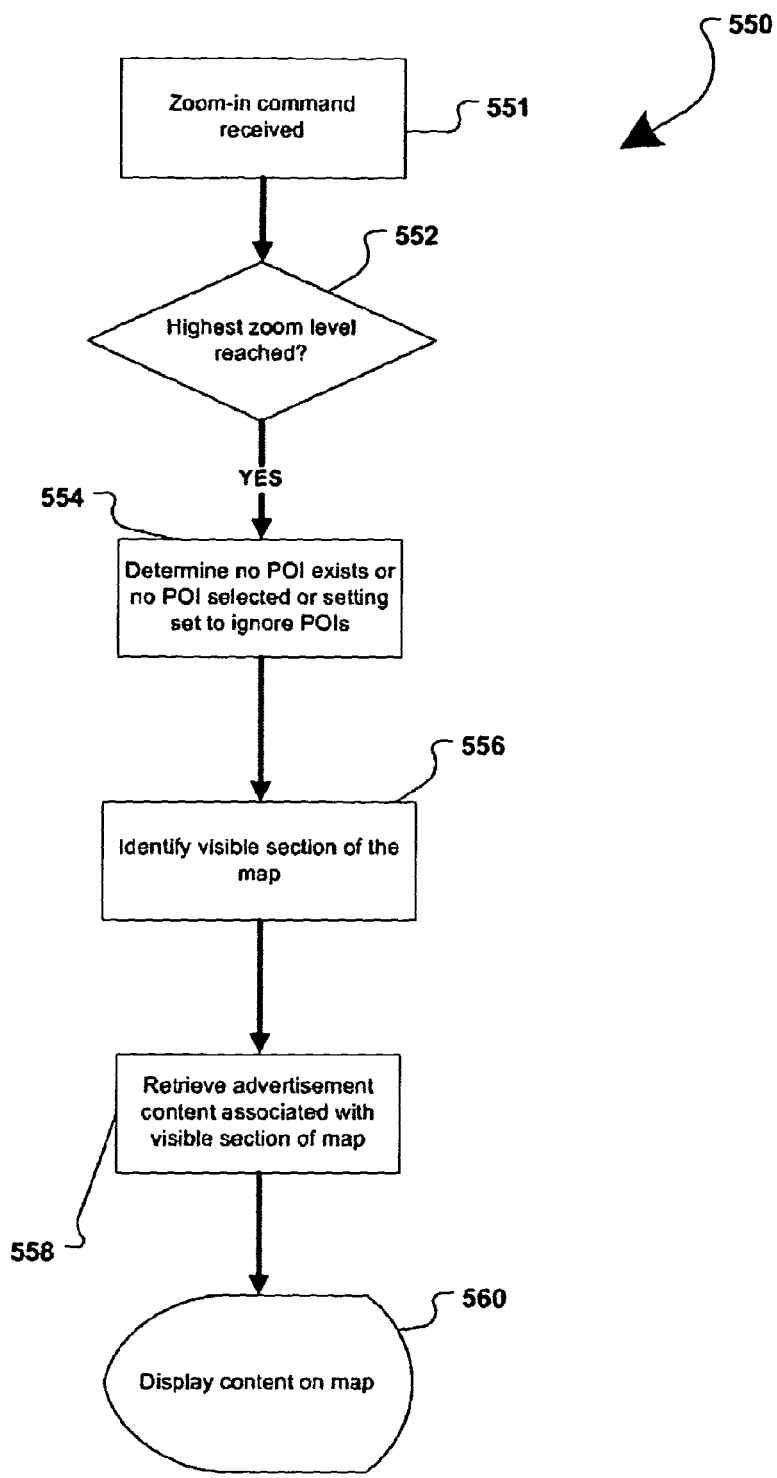

FIGS. 5A and 5B are generalized flow diagrams illustrating methodologies for retrieving POI advertisement content for display, according to various possible embodiments of the present invention. POI advertisement content may be retrieved from a content data store; or, if POI advertisement content is determine to not exist in a content data store, POI advertisement content may be retrieved from a website associated with the POI. Alternatively, content associated with a visible portion of a map may be retrieved and displayed as POI advertisement content.

Flow diagram 5A illustrates an embodiment in which advertisement content associated with a specific POI on a map is retrieved and displayed. In response to a zoom-in event at step 501 (e.g. a user invoking a zoom-in command on their map-displaying electronic device), at step 502 it may be determined whether the highest-allowable zoom level has been reached. In alternate embodiments, it may be determined whether the highest-allowable zoom level has been surpassed (i.e. in one embodiment zooming to the highest-allowable zoom level may display POI advertisement content, whereas in another embodiment attempting to zoom-in, once at the highest-allowable zoom level, may display POI advertisement content.)

If at step 502 it is determined the highest-allowable zoom level has been reached/surpassed (see discussion in earlier section), at step 504, the POI in focus may be determined (see example logic for determining POI in focus in flow diagram 400 in FIG. 4B.)

At step 506, advertising engine (e.g. an online service such as Google AdWords® or a social network like Facebook®, Facebook's Ad Exchange®, etc.) may be searched for advertisement content associated with the POI in focus, identified at step 504. In one embodiment, a database may contain various types of advertisement content associated with various types of POIs. For example, POIs representing shopping malls may have associated POI advertisement content associated with stores, such as sales. The advertisement content may be served via any popular contextual advertising service such as Google's AdWords®, Facebook®, etc.

Information gathered from the electronic device (e.g. its GPS location), and/or user of the electronic device (e.g. user's friends on Facebook®) may be used at step 506 to retrieve the advertisement content.

If at step 508 it is determined that, at step 506, POI advertisement content associated with the POI in focus has been found, at step 510 the POI advertisement content may be retrieved. At step 512 the POI advertisement content may be displayed.

If at step 508 it is determined that no POI advertisement content has been found at step 506, at step 514 a website associated with POI advertisement content 514, may be sought. At step 516, the website found at step 514, may be crawled to obtain content relevant to the POI. (Please see FIGS. 8 and 13 for discussion on automatically identifying and retrieving POI advertisement content from the internet.)

At step 512, POI advertisement content retrieved at step 516 may be displayed.

Referring now to FIG. 5B, flow diagram 550 illustrates an alternate embodiment in which POI advertisement content applies to an entire visible portion of a map. For example, POIs may not be displayed on a zoomed-in portion of a map for various reasons: no POIs may exist for that portion of the map; and/or the user may have turned off an option to display POIs; and/or mapping settings/preferences may have been set to treat a zoomed-in portion of a map as a single POI. In such embodiment, POI advertisement content (e.g. street photograph) which applies to the entire visible zoomed-in region, may be displayed.

At step 551, a user command to zoom in a map may be received. For example, on a hand-held device such as the iPhone®, the user may perform a "pinching-out" movement indicating a zoom-in command. In response, at step 552, it may be determined whether a maximum zoom level has been reached (i.e. no further map tiles with mapping/satellite data are available at the newly-requested zoom level). In an alternate embodiment, a logical "maximum zoom level" may be defined as an alternative to a physical zoom-in limitation defined by the lack of new map tiles/data to represent the newly-desired zoom level.

If at step 552 it is determined that the maximum zoom level has been reached, at step 554 it may be determined that content associated with the entire visible section of the map—as opposed to content associated with a specific POI on the map—should be retrieved.

At step 556, the visible section of the map may be identified. For example, in a map showing city streets, an entire city street (or visible portion thereof) may be identified as a collective POI. (as opposed to a specific POI, such as an individual house, store, landmark, etc.)

At step 558, advertisement content associated with the collective POI (i.e. visible section of the displayed map) may be retrieved and at step 560, the content may be displayed to the user.

Figure 6:
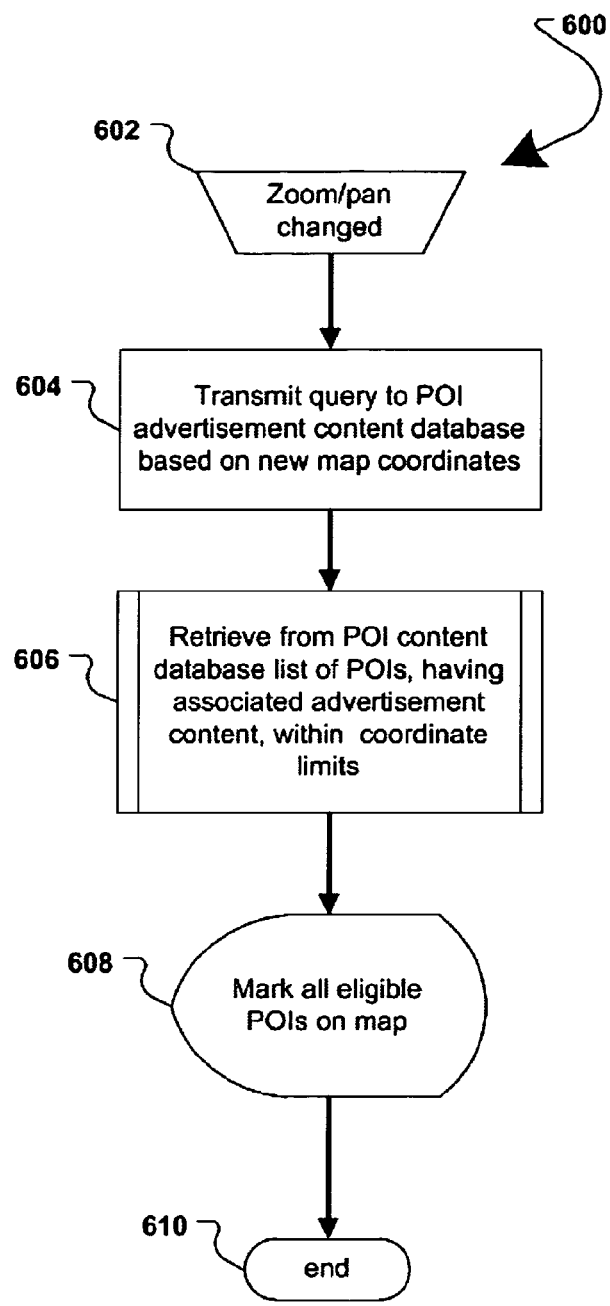
FIG. 6 is a generalized flow diagram illustrating demarcating and flagging locations on a map for which POI advertisement content exists, according to one possible embodiment of the present invention.

FIG. 6 is a generalized flow diagram illustrating demarcating and flagging locations on a map for which POI advertisement content exists, according to one possible embodiment of the present invention. For example, a user viewing a map containing a large number of restaurants, may choose to have restaurants whose menus are available as POI advertisement content, to be flagged. This would allow the user to pan over the map and "zoom into" those restaurants whose menus will be displayed once the user has zoomed in.

At step 602, a zoom-in, zoom-out or a pan event occurs. For example, the user increases the zoom level of a map, or decreases the zoom level of a map, or pans the map in any direction.

At step 604, a query, containing the new range of coordinates visible on a map, may be submitted to a POI advertisement content data store (e.g. an online server connected to a database containing POI advertisement content, locally-cached POI advertisement content, etc.)

At step 606, a list of POIs (e.g. containing, at minimum, the coordinates of each POI) may be retrieved. In one embodiment, a database engine associated with the POI data store may execute a query to return all POIs whose coordinates are within the range submitted at step 604. In alternate embodiments, the returned list may include other data associated with the POIs, such as thumb-nail photos, etc.

At step 608, all POIs on the list at step 606 may be flagged on the map. For example, a location marker (such as a pushpin icon) may be displayed on the map at the coordinates corresponding with every POI on the list at step 606.

At step 610, flow 600 may end. In alternate embodiments, the POIs flagged on a map, based on the availability of POI advertisement content for these POIs, may be grouped by—or delimited by—an association among the POIs. For example, POIs flagged on a map may represent POIs that have associated POI advertisement content and that have been defined by a social networking group (Please see FIG. 11 for further discussion.) For example, a dozen bars in a city block may have POI advertisement content associated with them, but only five of them may be flagged on a map that is being used by the members of a social network frequenting only these five bars.

Figure 7A:
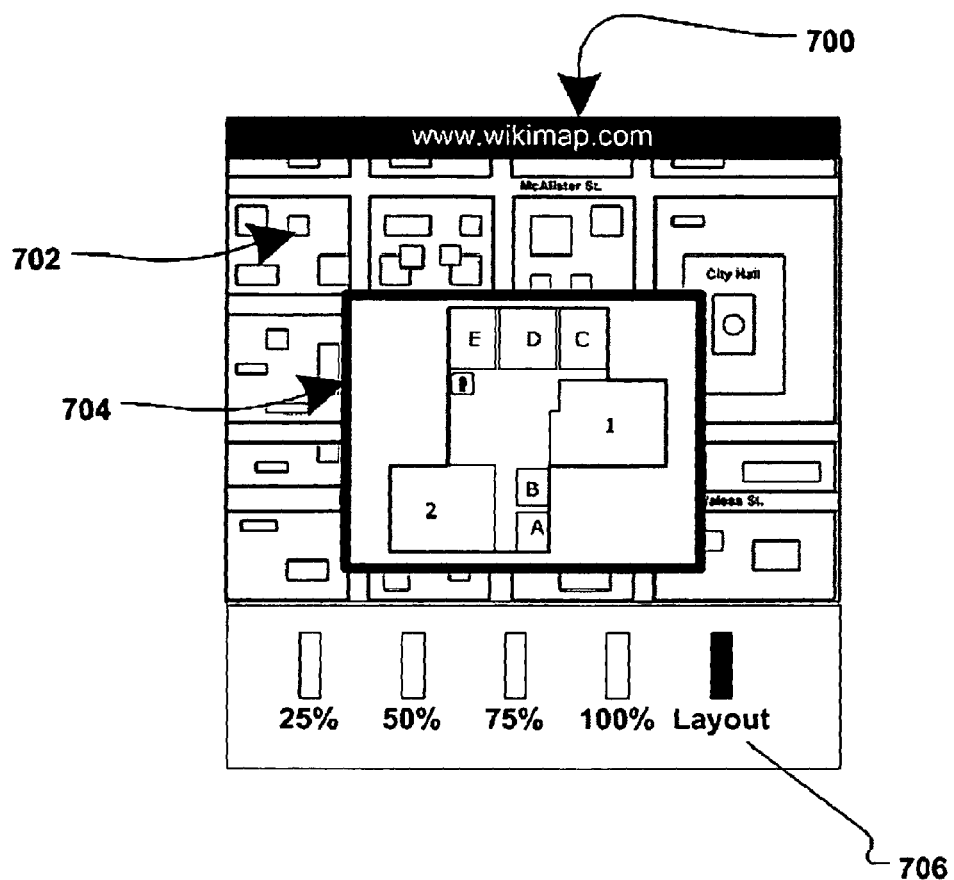
FIGS. 7A and 7B are generalized block diagrams illustrating displaying POI advertisement content on top of a map, obscuring only a portion of the map, according to one possible embodiment of the present invention
Figure 7B:
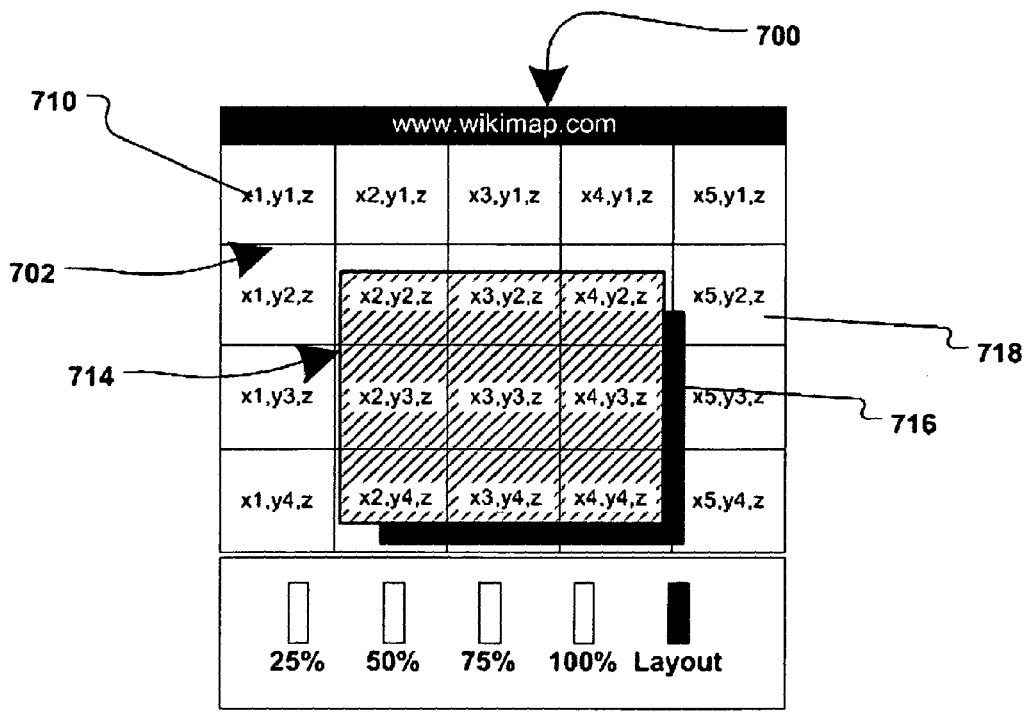

FIGS. 7A and 7B are generalized block diagrams illustrating displaying POI advertisement content on top of a map, obscuring only a portion of the map, according to one possible embodiment of the present invention. While in some embodiments discussed in previous figures, it may be advantageous to replace a map with POI advertisement content (e.g. on PDAs and smart phones, where screen size is too small to display both a map and POI advertisement content), in other embodiments it may be advantageous to display POI advertisement content as an image superimposed on the map. For example, when a map is displayed on a large screen, POI advertisement content may take up a small area of the map. In such case it may be more useful for the user to see the POI advertisement content, while being able to view the map around it.

Another advantage of displaying POI advertisement content as a separate image superimposed on a map, may be the increased speed for redrawing the map once the POI advertisement content is removed. When POI advertisement content needs to be removed or hidden (for example, when a user pans the map or zooms out) it may be faster to hide/remove an overlay showing POI advertisement content, as discussed in this embodiment, than to redraw the map, as may be required in an embodiment where map content is replaced with POI advertisement content.

Referring to FIG. 7A, map-display application 700 may display a map 702. In response to a zoom-in event past the highest-allowable zoom level (for example, as indicated by the zoom-indication bar labeled "Layout" 706) POI advertisement content 704 may be displayed over map 702 in map-display application 700.

In the presently-preferred embodiment, POI advertisement content 704 may be displayed centered over the POI location it is associated with (i.e. the center of the POI advertisement content may be at the coordinates as the center of the POI location.) In alternate embodiments, POI advertisement content 704 may be displayed at other locations on the map, for example in a corner of the map, in an attempt to keep the POI location associated with POI advertisement content 704, un-obscured from the user's view. In another embodiment the user may be able to set preferences for the default placement of POI advertisement content. In yet another possible embodiment, the user may be able to use a pointing device to move the POI advertisement content on the map.

Referring now to FIG. 7B, in commonly-used mapping technologies (e.g. used by mapping services such as Google Maps®, Yahoo! Maps®, Windows Live Search Maps®, etc.) a map 702 is composed of map tiles (e.g. map tile "x1, y1, z" 710, which is part of a matrix of twenty map tiles, x1,y1,z1-x5,y4,z1) In response to user requests such as zoom, pan and selecting new locations, new map tiles may be loaded and displayed by mapping application 700. Technologies such as AJAX, HTML, DHTML, Javascript, etc. may be used to render a map from map tiles generated by a mapping server.

In the presently-preferred embodiment, POI advertisement content may be displayed as a map overlay object. An overlay object is an object on the map that is tied to latitude/longitude coordinates, so it can move when the map is dragged (i.e. panned) or zoomed. An overlay object may display content—for example an image—whose source is different from the source of the map. Various types of overlays may be used in the implementation of the present invention; for example, custom overlays, layer overlays, etc.

According to the present invention, map 702 may be constructed from map tiles transmitted to map-display application 700 from a mapping server, while overlay object 714 may display POI advertisement content as an image (or in the form of other media) transmitted to map-display application 700 from a different source than the mapping server.

Various styles and methods may be used to construct, present and hide POI advertisement content to the user. Overlay object 714, displaying POI advertisement content, may be constructed (i.e. rendered with POI advertisement content) in the device's memory, invisible to the user. Overlay object 714 may become visible to the user only once all POI advertisement content has been retrieved and rendered on the memory-resident overlay object.

An overlay object may be removed from the user's view using various methods, including but not limited to, invoking the "hide" (or similar) method of the overlay object 714, invoking the "remove" (or similar) method of overlay object 714, by unloading the overlay object 714 from memory, etc.

A shadow effect graphic 716 may be displayed in proximity of overlay object 714. Shadow effect graphic 716 may comprise a graphics displayed as translucent, such that map tiles obscured by shadow effect graphic 716 (e.g. map tile x5,y2,z 718) may be partially visible. Shadow effects may be used both for aesthetics and to help delineate for the user POI advertisement content from the map.

Figure 8:
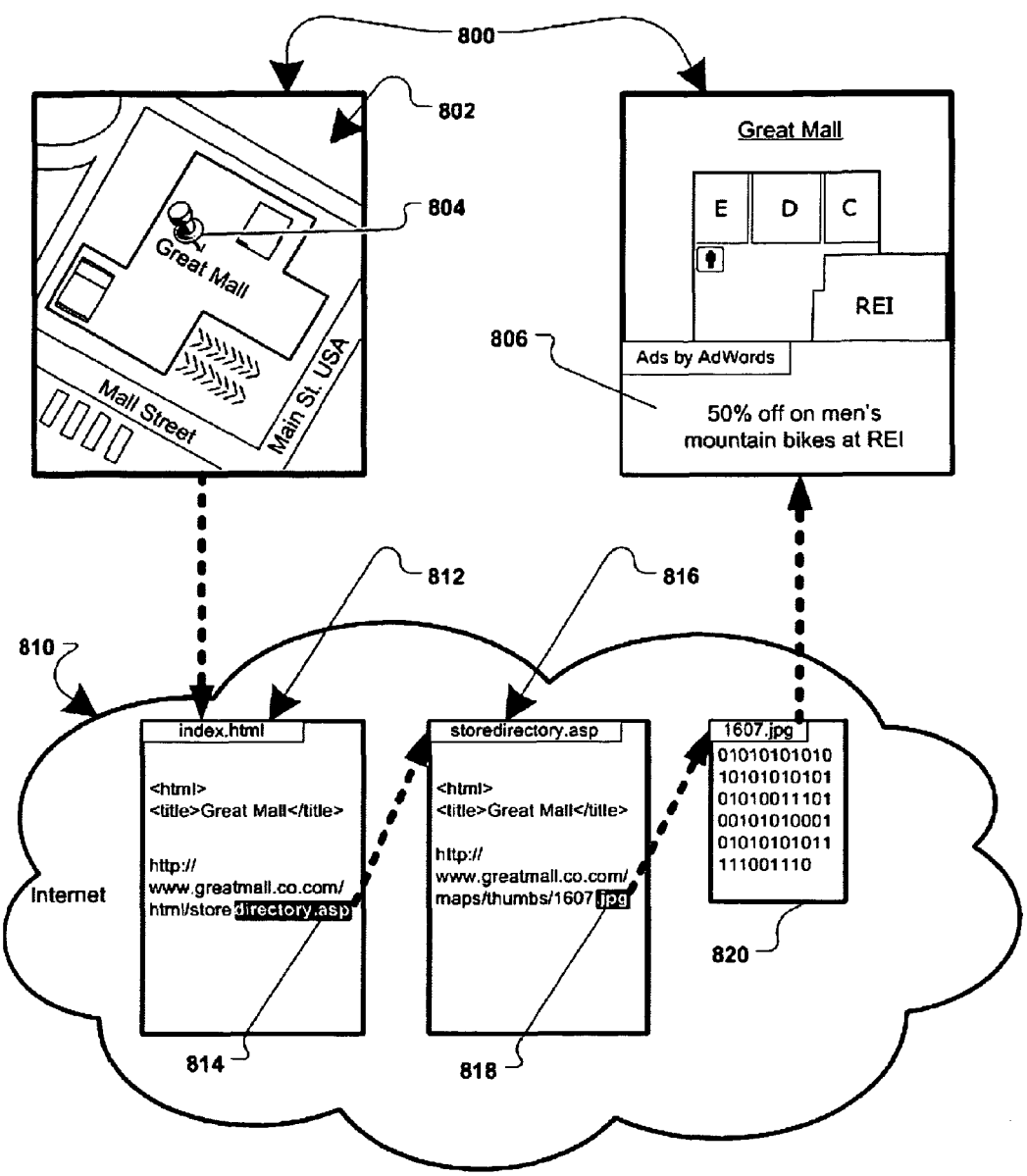
FIG. 8 is a generalized block diagrams illustrating automatically obtaining POI advertisement content, according to one possible embodiment of the present invention.

FIG. 8 is a generalized block diagrams illustrating automatically obtaining POI advertisement content, according to one possible embodiment of the present invention. Content associated with a POI may not exist in a data store. The internet may be searched automatically for content associated with a POI, for display to the user as POI advertisement content.

Map-display application 800 may display a selected area of a map 802. Map 802 may display a pushpin 804, indicating the existence of information associated with a POI (in this example "Great Mall"). In response to a user command to zoom-in to/past the highest-allowed zoom level, an automatic process may search the internet for content associated with the POI in focus (in this example, the POI associated with the pushpin 804) and display the content to the user.

Map-display application 800 may perform electronic searches on the internet 810. Various searches may be conducted to identify a website associated with the POI in focus (e.g. marked by pushpin 804) For example, online versions of yellow pages, search engines such as Google® and online directories mashing search engine information with geographic locations, may be searched to identify a website associated with a POI.

A website associated with a POI is likely to have a main landing page 812 (usually named "index.htm", "index.htm", etc.) containing un-compiled computer code (e.g. HTML, DHTML, Javascript, XML, etc.) The code of the landing page may be scanned for terms associated with content. For example, terms including "directory", "map", "content", "layout", etc. that are part of hyperlinks and that contain suffixes (e.g. ".html", ".htm", ".asp", ".aspx", etc.) may point to another web page containing relevant content, or links, to relevant content. For example, term "directory.asp" 814 on page "index.html" 812 is part of a link "http://www.greatmall.co.com/html/storedirectory.asp" to web page "storedirectory.asp" 816.

Pages on the websites may be further crawled to identify relevant content. Page "storedirectory.asp" 816 may be scanned for terms identifying graphics (e.g. ".jpg", ".gif", ".png", etc.) A hyperlink containing a graphics suffixes (e.g. "http://www.greatmall.co.com/maps/thumbs/1607.jpg" containing suffix ".jpg" 818) may be followed to the associated graphic. In this example, image "1607.jpg" 820 may be retrieved by map-display application 800 and displayed as POI advertisement content 806.

Please note that the process of crawling a website to identify a specific type of content, as summarized in the two preceding paragraphs, is well understood in prior art and is used widely by the majority of the search engines—thus the present invention may rely on this process to derive POI advertisement content.

In another embodiment, crawling websites to identify POI advertisement content may be performed routinely (in a manner analogous to the crawling performed by web search engines such as Google® to index general web sites) and POI advertisement content identified may be aggregated into one or more data stores dedicated to POI advertisement content. Future searches for POI advertisement content may be performed against such dedicated POI advertisement content data stores.

Figure 9:
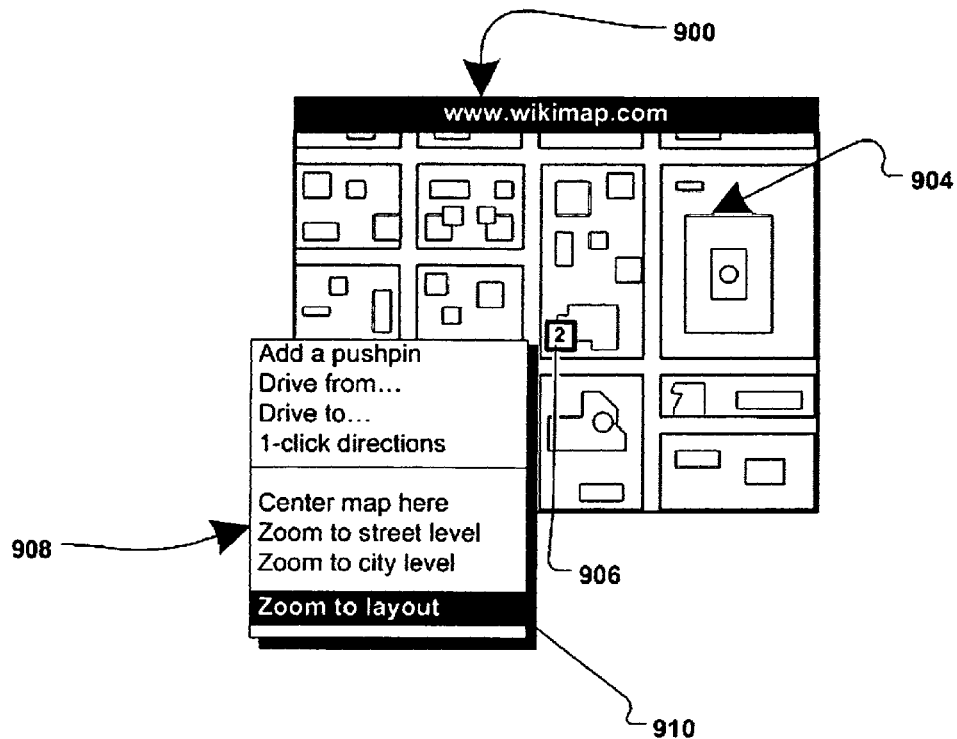
FIG. 9 is a generalized block diagrams illustrating displaying POI advertisement content in response to a command in a context menu, according to one possible embodiments of the present invention.

FIG. 9 is a generalized block diagrams illustrating displaying POI advertisement content in response to a command in a context menu, according to one possible embodiments of the present invention. A context menu (or pop-up menu, or any menu which is displayed in response to a user's action, such as clicking an item in a graphical user interface, offering a list of options which vary depending on the context of the action, the application running, and the item selected) may be used to assist the user of a map-display application to alter views and display additional information on a map.

Map-display application 900, displaying a map 904, may display a context menu 908 in response to a user action (e.g. a pointing-device action such as right-clicking the mouse.) At present, in common mapping applications, context menu 908 may include functions such as "Add a pushpin", "Drive from . . . ", "Drive to . . . ", "1-click directions", "Center map here", "Zoom to street level", "Zoom to city level", etc. A user's selecting one of the functions above, from the context menu, may cause the map-display application to perform the requested function, which may result in the retrieval of more data from online resources and the display of additional information.

In previous embodiments of the present invention, the discussion included a user's zoom-in action which in turn may cause the display of POI advertisement content. In an alternate embodiment illustrated in FIG. 9, a user may choose a function from the context menu to display POI advertisement content.

For example, the function "Zoom to layout" 910 may display on context menu 908, associated with map-display application 900. In response to a user's selection of the "Zoom to layout" 910 function, map-display application 900 may retrieve and display POI advertisement content (e.g. associated with a location 906 marked on the map 904)

Similarly, keyboard shortcuts may be used to invoke a function to display POI advertisement content associated with a location on the map. Keyboard shortcuts are commonly used on computing devices, allowing a user to send a command to an application with a simple keystroke. For example, the key combination "control-c" is commonly used as a "copy" function. In an analogous manner, a different key-combination may be defined in the map-display application, allowing a user to use a key-combination to invoke the display of POI advertisement content associated with a map, or location on a map, displayed by the map-display application.

In a portable device (e.g. a smart phone such as the iPhone®, Palm device, etc.) a touch screen may be used to invoke the display of POI content on a map displayed on the device. For example, certain input received from the touch screen, resulting from a user's touch and/or stylus touch, may generate a command to display POI advertisement content on the map.

FIGS. 10A, 10B, 10C and 10D are generalized block diagrams illustrating displaying varied POI advertisement content association with a location on a map, according to other possible embodiments of the present invention. A user may be displayed varied types of POI advertisement content associated with a selected location on a map, and the user may choose the type of POI advertisement content to display.

Figure 10A:
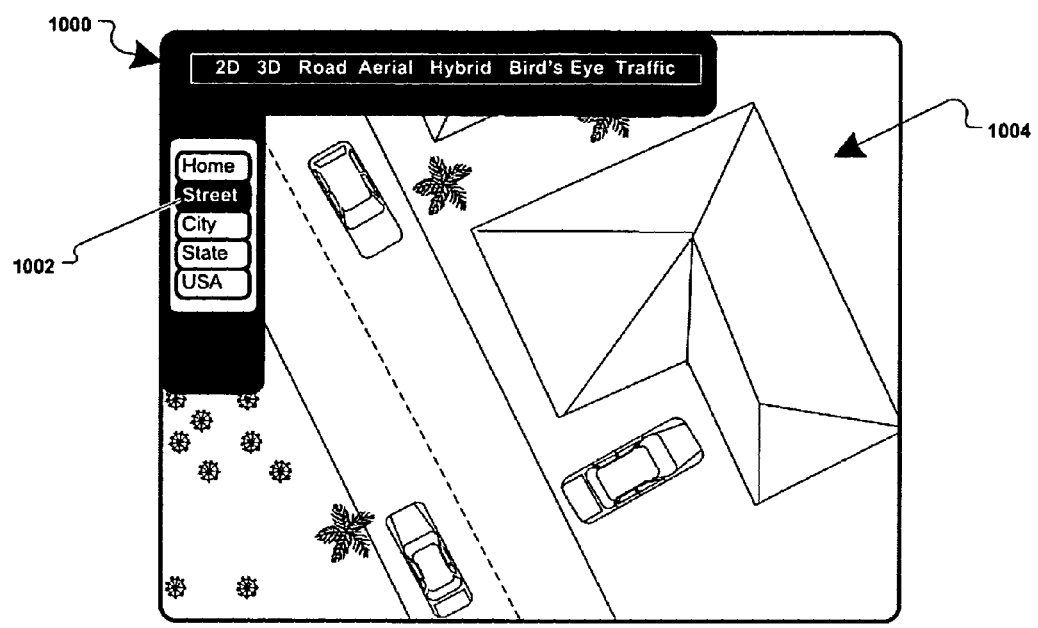
FIGS. 10A, 10B, 10C and 10D are generalized block diagrams illustrating displaying varied POI advertisement content association with a location on a map, according to other possible embodiments of the present invention.

Referring to FIG. 10A, map-display application 1000 may display a map 1004. In most commonly-used mapping applications, the user is allowed to choose a zoom-level for the display of the map. For example, zoom-levels may be quantified b zoom-terms such as "USA", "State", "City", "Street", etc. A user may select a zoom-term and in response, the map may be zoomed to a pre-determined zoom-level. For example, the user may choose zoom-term "Street" 1002, causing map 1004 to display a map at a "street level" (i.e. generally the highest-obtainable zoom level, commonly displaying one or more houses and a few streets.)

Figure 10B:
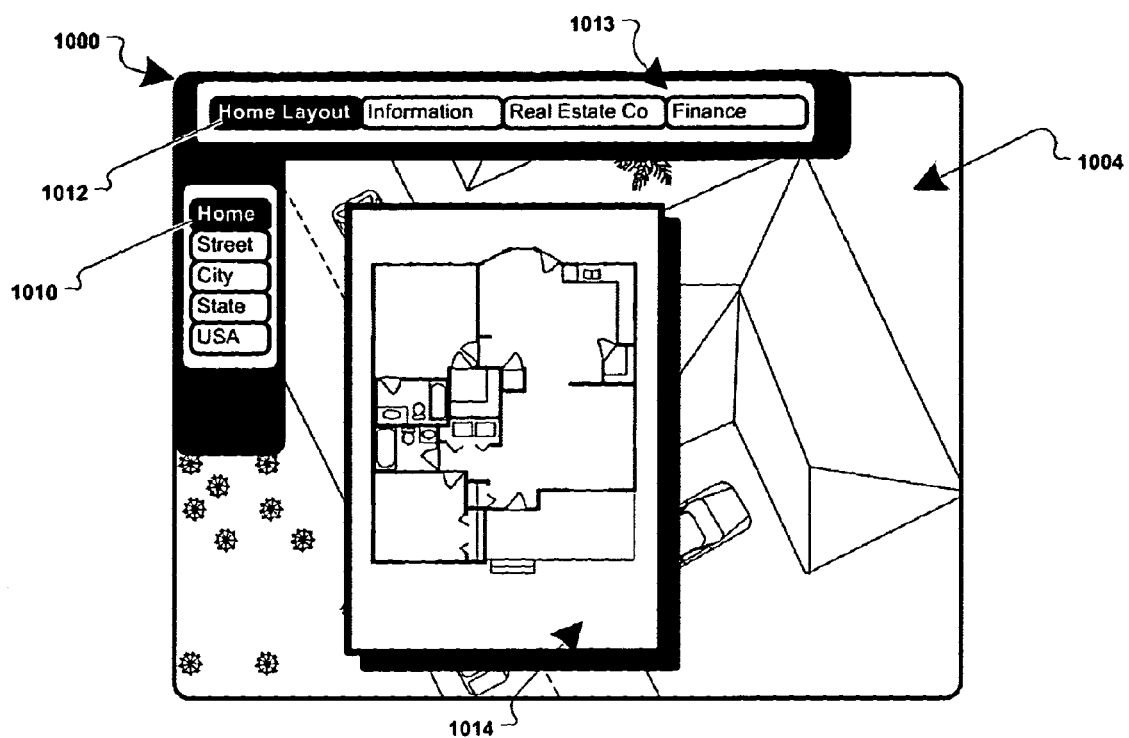

Referring now to FIG. 10B, the user may select a zoom-term associated with POI advertisement content. For example, the user may select the zoom-term labeled "Home" 1010 which, in this example, may display real estate-related information.

In response to a user's selecting a zoom-term associated with POI advertisement content, a POI advertisement content menu 1013, listing all available POI advertisement content types, may be displayed. In this example, POI advertisement content menu 1013 may list content-type-terms such as "Home Layout" 1012, "Information", "Real Estate Co", "Finance", etc.

In the presently-preferred embodiment, a POI advertisement content menu may be rendered dynamically, depending on the types of POI advertisement content associated with a location on a map. In alternate embodiments, services providing a mapping service and POI advertisement content (for example, real estate companies) may specify the content of a POI advertisement content menu. In other embodiments other methods may be used to display the content-type-terms used in a POI advertisement content menu.

In this example, a user's selecting content-type-term "Home Layout" 1012 may cause a layout map of the house at the focal point of the map, to be displayed as POI advertisement content 1014. POI advertisement content 1014 may be an image, media, KML (for Keyhole Markup Language) file, document, etc.

In the presently-preferred embodiment, POI advertisement content 1014 may display over the map, possibly leaving portions of the map 1004 visible to the user. In alternate embodiments, POI advertisement content 1014 may be displayed in place of map 1004 (or over the entirety of map 1004 obscuring map 1004 completely.)

Figure 10C:
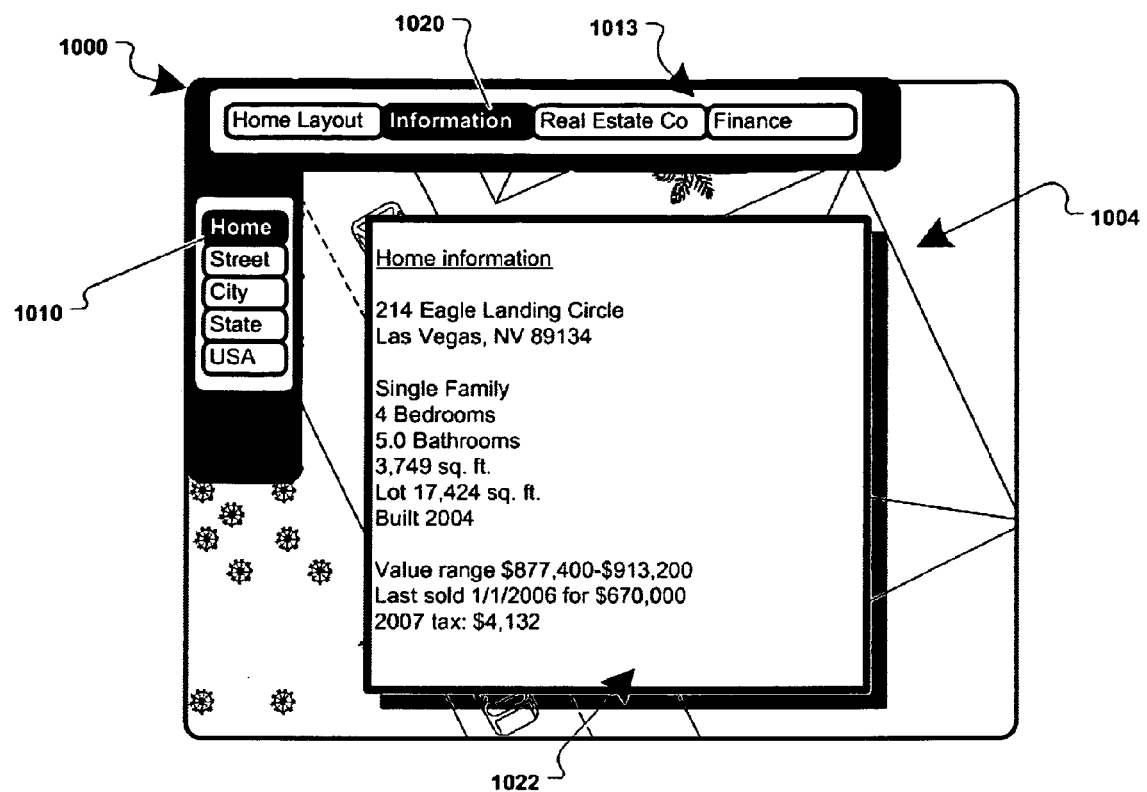

Referring now to FIG. 10C, a user may select a different content-type-term (e.g. "Information" 1020) from POI advertisement content menu 1013, which may cause a different POI advertisement content 1022 to be displayed. In this example, selecting content-type-term "Information" 1020 may cause POI advertisement content 1022 to display. POI advertisement content 1022 may contain information on the house at the focal point of the map 1004.

Figure 10D:
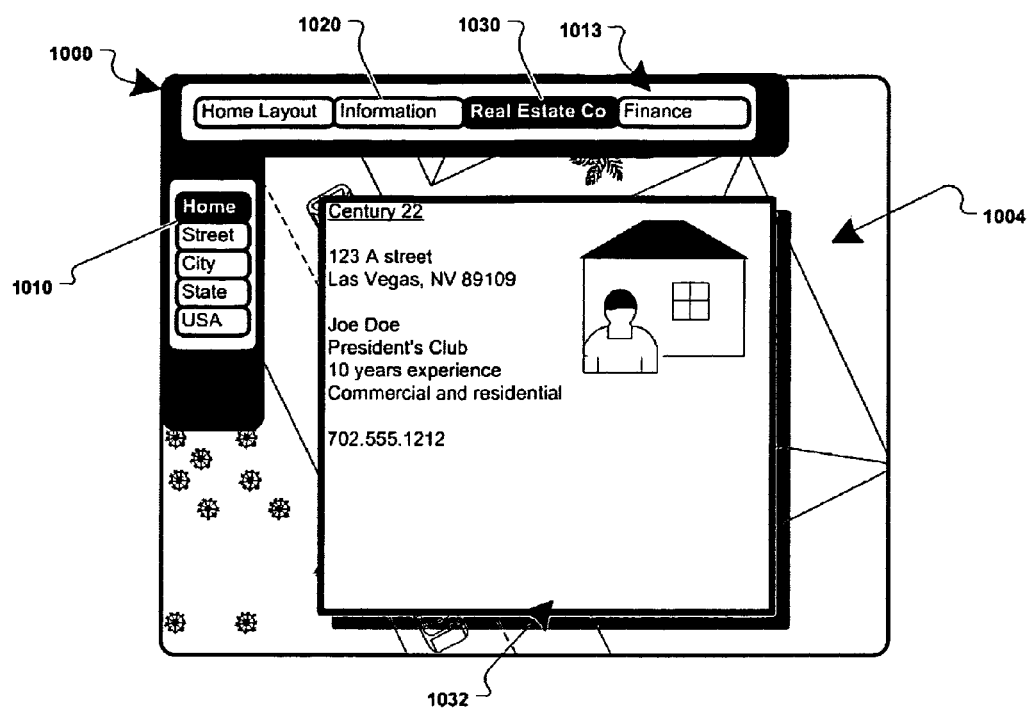

Referring now to FIG. 10D, a user may select a different content-type-term (e.g. "Real Estate Co" 1030) from POI advertisement content menu 1013, which may cause a different POI advertisement content 1032 to be displayed. In this example, selecting content-type-term "Real Estate Co" 1030 may cause POI advertisement content 1032 to display. POI advertisement content 1032 may contain, for example, information on the real estate company listing the house at the focal point of the map 1004.

In alternate embodiments, map-display application 1000 may store the last user selection of content-type-term from POI advertisement content menu 1013. In response to a user zoom-in action at the "Home" 1010 level, the POI advertisement content displayed may correspond to the last type of POI advertisement content displayed previously. For example, a user may select content-type-term "Information" 1020 from the POI advertisement content menu 1013. Then the user may zoom-out, causing POI advertisement content to not be displayed. The user may pan the map until another house becomes the focal point of the map. The user may zoom-in to the "Home" level 1010 and the POI advertisement content displayed may be "Information" pertaining to the house which is now the focal point.

Figure 11:
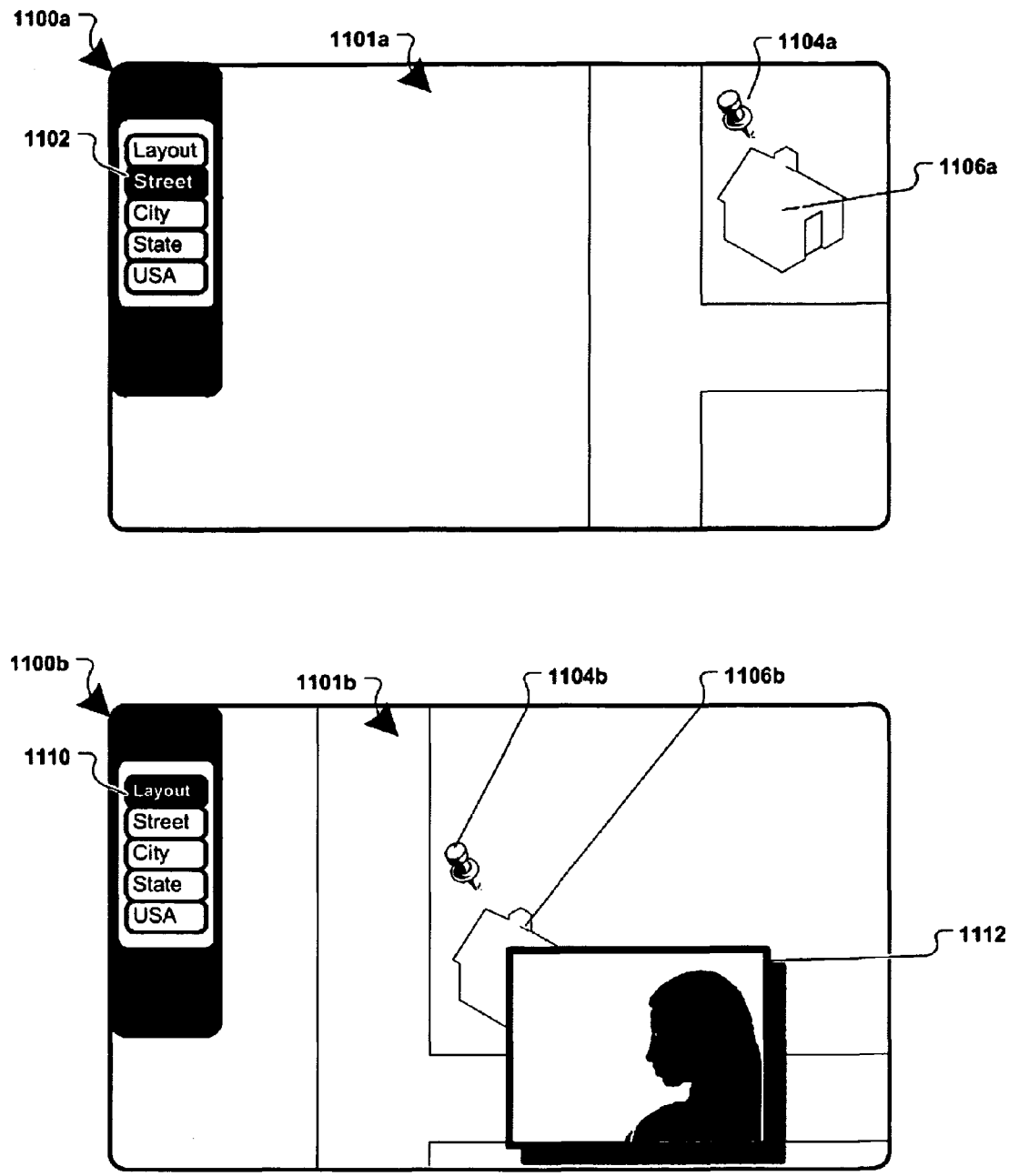
FIG. 11 is a generalized block diagram illustrating displaying POI advertisement content associated with social networking websites, according to one possible embodiment of the present invention.

FIG. 11 is a generalized block diagram illustrating displaying POI advertisement content associated with social networking websites, according to one possible embodiment of the present invention. Social networking websites, such as MySpace™, Facebook™, etc. allow users to exchange information about themselves and their interests with remote users. For example, users can create a virtual community and geo-tag (i.e. assign content to a geographic location) common points of interest.

Please note that in FIG. 11, one map-display application is shown in two phases: as map-display application 1100a and then as map-display application 1100b. Items related to the map-display application are labeled 1101a, 1104a, and 1106a when displayed in conjunction with one phase of the map display application 1100a. When displayed in conjunction with the second phase 1100b of the map-display application, the items above are labeled 1101b, 1104b and 1106b, respectively.

A map-display application 1100a may display a map 1101a. Map 1101a may include geographic content ("POI") 1106a (e.g. buildings, landmarks, etc.) POI 1106a may be marked (e.g. by pushpins 1104a) denoting POI advertisement content associated with the POI 1106a.

Map 1101a may be displayed at the maximum-zoom level (e.g. as indicated by the zoom-level "Street" 1102) Attempting to zoom past the maximum-zoom level (e.g. as indicated by the zoom-level "Layout" 1110) may cause the display of POI advertisement content 1112 on map 1101b in map-display application 1100b. POI advertisement content 1112 may be associated with the POI 1106b at the focal point of the map, and/or with a pushpin 1104b suggesting availability of POI advertisement content associated with the POI 1106b.

While the displaying of the POI advertisement content at the maximum-zoom level has been described above, there are various other conditions under which the POI advertisement content can be displayed. As zoom technology improves, it may be possible to obtain very detailed maps and it may be more useful to display the POI advertisement content at a zoom level lower than the maximum zoom. For example, the POI advertisement content may be displayed when a predetermined zoom level has been exceeded, which the user can set. In one embodiment, the user may wish to have POI information at all zoom levels. Alternatively, the user may set the POI advertisement content to only be displayed when a predetermined zoom level is met such as: street level or a predetermined viewing scale. The scale of the display is a ratio of physical size to displayed size. Thus, a map of a city street may be displayed at a scale of 1:10,000 or 1 inch=1,000 feet or any other ratio.

As discussed above, the zoom level can correspond to a specific scale and in an embodiment, the POI information can be set to any zoom level by the user. At the lowest zoom level, the entire planet may be displayed and POI information can be the Earth's physical characteristics: diameter, volume, mass, speed of rotation, etc. As the user zooms in, continents may be displayed and the POI information may include information about each displayed continent such as: population, area, climate, number of countries, etc. Similar POI information may be provided for zoom levels that display: cities, districts, streets, blocks and buildings.

POI advertisement content 1112 may be related to social networking. For example, if POI 1106b were the place of residence of one of the members of an online network/group, POI advertisement content 1112 may present the member's information/blog/website, etc. In another example, POI 1106b may be a sports stadium/concert hall/restaurant/bar/meeting place of significant to members of a social network, whereby POI advertisement content 1112 may be information related to the meeting place, such as venue/menu/hours of operation/website etc.

In the presently-preferred embodiment, map 1101b may be automatically centered within map-display application 1100b, in response to a zoom action to the "Layout" 1110 level. Map 1101b may be automatically repositioned (panned) such that POI 1106b is at the center, as compared to the previous display position of the POI 1106a (shown right-and-top of center) on map 1101a, displayed at a "Street" 1102 zoom level.

FIGS. 12A, 12B, 12C and 12D are a generalized flow diagrams illustrating various algorithms used by a map-display application for retrieving and displaying POI advertisement content, according to numerous possible embodiments of the present invention. Map-display applications (e.g. web browser-based applications with a back-end mapping service, such as Google Maps®, Yahoo! Maps®, Windows Live Search Maps®, etc.) respond to user requests, in the form of events. An event is registered to be received by the map-display application from the operating system on the client device. An event (e.g. "zoom-in" event) may be generated in response to a user's action (e.g. rolling the trackball of a mouse upwards). In response to an event, a map-display application may request new map tiles, new images, etc. and/or change its display.

Mapping services, (e.g. Google Maps®, Yahoo! Maps®, Windows Live Search Maps®, etc.) provide application programming interface ("API") to allow a web page to interface with a the mapping service. The example below illustrates interfacing with Yahoo! Maps®, however APIs provided by other mapping services may be used to implement the present invention to work with all other mapping services.

In the presently-preferred embodiment, a web browser ("map-display application") may be enabled for displaying a map off of a remote mapping server. Code may be added to a web page to allow the web page to display a map off of a remote mapping server, while executing within the map-display application. An example of one possible implementation of creating a map-enabled web page:

Including Yahoo! Maps AJAX API in a webpage and initializing a map

```
1    <html>
2    <head>
3    <script type="text/javascript"
4    src="http://api.maps.yahoo.com/ajaxymap?v=3.7&appid=YahooDemo">
5    </script>
6    <style type="text/css">
7    #map{
8    height: 75%;
9    width: 100%;
10   }
11   </style>
12   </head>
13   <body>
14   <div id="map"></div>
15   <script type="text/javascript">
16       // Create a map object
17       var map = new YMap(document.getElementById('map'));
18       // Add map type control
19       map.addTypeControl( );
20       // Add map zoom (long) control
21       map.addZoomLong( );
22       // Add the Pan Control
23       map.addPanControl( );
24       // Set map type to either of: YAHOO_MAP_SAT, YAHOO_MAP_HYB,
25       // YAHOO_MAP_REG
26       map.setMapType(YAHOO_MAP_SAT);
27       // Set the map zoom rang
28       map.setZoomRange(0,16);
29       // Display the map centered on a geocoded location
30       map.drawZoomAndCenter("San Francisco", 3);
100  </script>
101  </body>
102  </html>
```

Figure 12A:
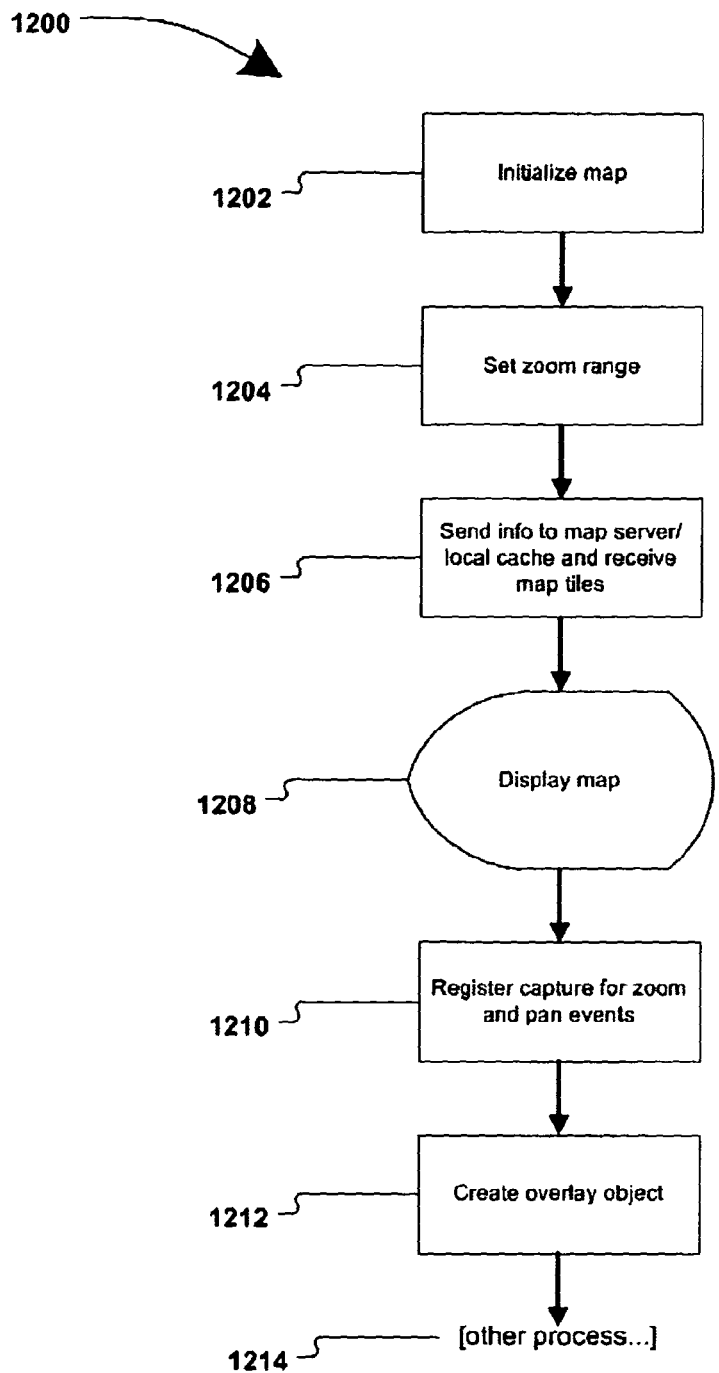
FIGS. 12A, 12B, 12C and 12D are generalized flow diagrams illustrating various algorithms used by a map-display application for retrieving and displaying POI advertisement content, according to numerous possible embodiments of the present invention.

Referring to FIG. 12A, flow chart 1200 illustrates one example of initializing a map-display application, registering zoom and pan events and creating an overlay object (for future display of POI advertisement content.)

At step 1202, map creation and initialization steps may take place. For example, initialization steps may include: referencing the Yahoo! Maps AJAX API library with a unique code id (line 4 in the code snippet above), creating a map object (line 17), adding a zoom control to the map (line 21), adding a pan control (line 23), setting the type of map to be displayed (line 26), etc.

At step 1204, a zoom-range for the map may be set (line 28). A zoom-range is a value-pair with one value specifying the lowest/minimum zoom level and one specifying the highest/maximum zoom level. In this example, Yahoo! Maps® API is used, thus code "map.setZoomRange(0,16);" (line 28) indicates the highest/maximum zoom level being "0" and lowest/minimum being 16. In other examples where other mapping services' API is used (e.g. Google Maps® API) other conventions may be used (e.g. lower number indicating the minimum zoom level, such as zero for Earth from space, and the higher number indicating the maximum zoom level.)

At step 1206 the geocoded location of the map may be transmitted to the mapping server (line 30) and map tiles may be received from the mapping server and displayed, at step 1208.

User commands, such as zoom and pan, transmitted to the map-display application (e.g. via an input device such as keyboard, touch screen, stylus, mouse, etc.) may be used to trigger the logic for displaying POI advertisement content. Sample code to capture events (i.e. events generated by user commands, such as zoom and pan) may include, in one implementation:

| Capturing zoom/pan events |
| --- |
| 40   //Register to capture a zoom event |
| 41   YEvent.Capture(map, EventsList.changeZoom, POIContentZoom); |
| 42   //Register to capture a pan event |
| 43   YEvent.Capture(map, EventsList.changePan, POIContentPan); |

At step 1210, zoom and pan events may be registered to be captured and in response, functions to handle the events may be assigned. For example, a function "POIContentZoom( )" to be called upon a user zoom event may be assigned (line 41). Another function "POIContentPan( )" may be assigned to handle user pan events (line 43).

POI advertisement content may be displayed as an overlay object. An overlay object is an objects on the map that is tied to latitude/longitude coordinates, so it can move when the map is dragged (i.e. panned) or zoomed. An overlay object may display content—for example an image—whose source is different from the source of the map. Various types of overlay objects may be used in the implementation of the present invention; for example, custom overlays, layer overlays, etc. An example of one possible implementation of creating an overlay object on a map:

| Adding overlay object to map to contain and display POI advertisement content |
| --- |
| 50   var cPoint = new YCoordPoint(50,50); //define point on map for overlay |

| Adding overlay object to map to contain and display POI advertisement content |
| --- |
| 51   var cOverlay = new YCustomOverlay(cPoint); //create overlay object |
| 52   var cObject = YUtility.createNode('IMG','overlay01'); //create note of type image |
| 53   //define source of image to be used in overlay |
| 54   cObject.src = 'http://www.wikimap.com/images/placeholder.gif'; |
| 55   cObject.style.width=0; //initially overlay has no width or height so doesn't show |
| 56   cObject.style.height=0; |
| 57   // attach object to overlay |
| 58   YUtility.appendNode(cOverlay,cObject); |
| 59   // add overlay to map |
| 60   map.addOverlay(cOverlay); |

At step 1212, an overlay object may be added to the map displayed at step 1208. In this example, the coordinates on the map where POI advertisement content would later be displayed may be defined (line 50), an overlay object may be declared as an image (line 52), the source (i.e. URL) of a blank placeholder image may be defined (line 54), the overlay image may be set to size zero (lines 55 and 56), overlay properties may be assigned to the overlay object (line 58), and the overlay object may be added to the map object (line 60).

In this example, a dummy image may be assigned to an overlay object as a placeholder for future POI advertisement content, and the overlay object, being of size zero, may be added to the map. Using this algorithm of pre-creating a blank, invisible overlay object before any POI advertisement content is selected, then when POI advertisement content becomes available, rendering of POI advertisement content and resizing the overlay object to make the POI advertisement content visible, may make the rendering of POI advertisement content faster.

In alternate embodiments, other algorithms may be used, for example, hiding the overlay object until POI advertisement content needs to be displayed, creating an overlay object only at the time POI advertisement content needs to be displayed, using other types of overlays (e.g. to store media) and assigning various styles to overlays (e.g. different styles for different types of POI advertisement content) etc.

At step 1214 other functionality may be added and other processes invoked.

Figure 12B:
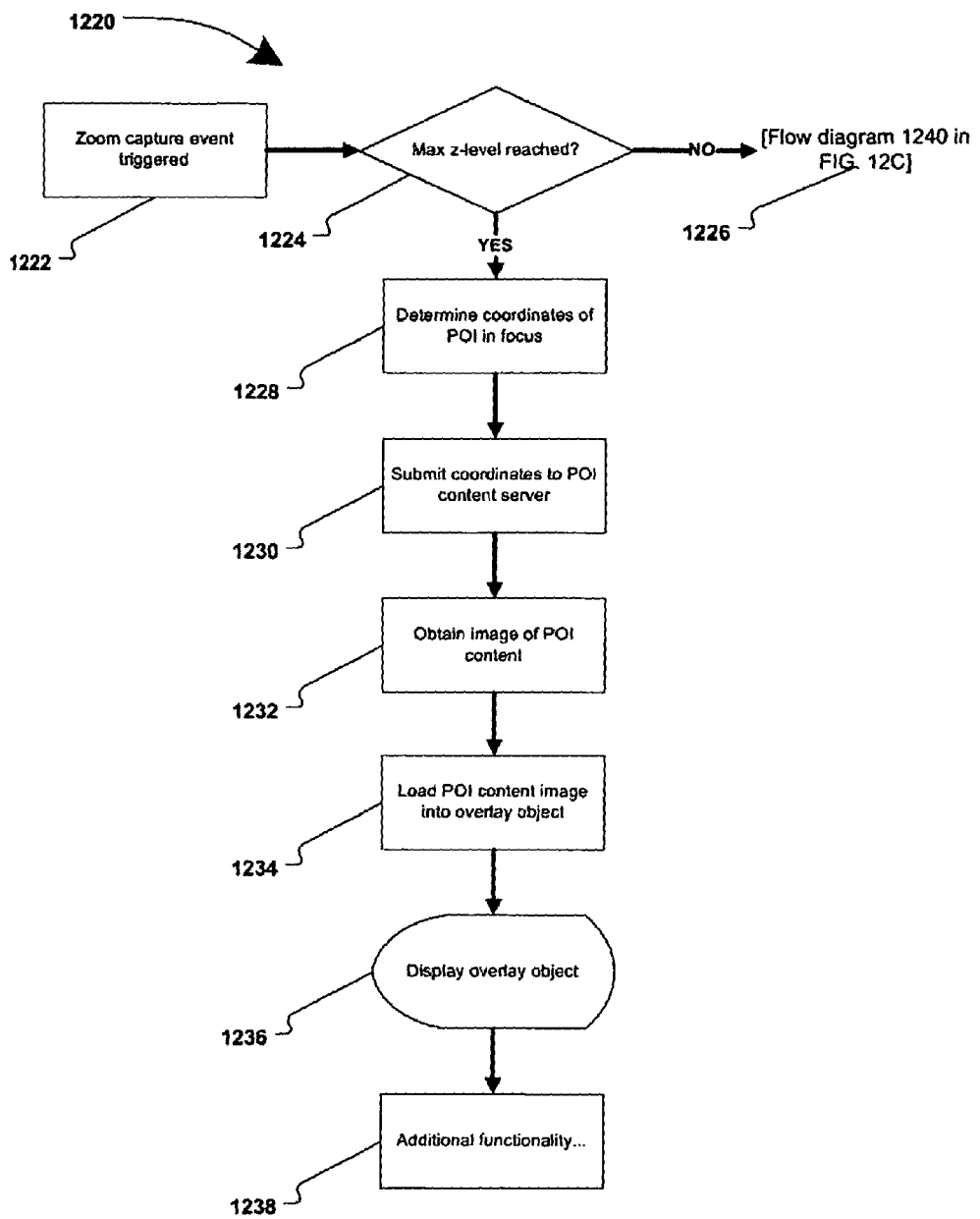

Referring now to FIG. 12B, the logic of flowchart 1220 may be implemented in response to a zoom event (i.e. the operating system notifying the map-display application that a zoom command has been issued, for example via a user's input device.) An example of one possible implementation of the function "POIContentZoom ( )", assigned to handle zoom events (line 41):

| Function POIContentZoom( ) |
| --- |
| 70   function POIContentZoom (_e, _c){ |
| 71   if (map.getZoomLevel( )==1) |
| 72   {   // code to identify POI in focus and request information from server |
| 73       // code to define new image in overlay |
| 74       // code to make overlay visible |
| 75       // code to reposition/resize overlay to fit over POI on map |
| 76       // any other code for displaying POI advertisement content in overlay |
| 77       POIcontentVisible=true; //indicate overlay is visible through a variable |

-continued

Function POIContentZoom( )

```
78    } else if (POIcontentVisible)
79    {
80        // code to hide overlay
81        // any other code to restore map to original size/postion/view
82        POIcontentVisible=false; //indicate overlay is not visible through
          a variable
83    }
84 }
```

At step 1222, function "POIContentZoom (_e, _c)" (line 70) may be automatically invoked in response to a user's zoom action. At step 1224, if is determined that the maximum zoom level is reached (e.g. zoom level is 1 where 1 is the maximum, see line 71) at steps 1228-1238, the POI advertisement content associated with the POI on the map, may be retrieved and displayed.

At step 1228, the coordinates and/or name and/or other identifier ("POI information") of the POI in focus may be obtained (line 72). At step 1230 the POI information may be transmitted to a server (e.g. mapping server, POI advertisement content server, database, etc.) to identify the POI and search for POI advertisement content associated with the POI information.

At step 1232, POI advertisement content (i.e. a link to an image, or any other media file) may be received from the server. At step 1234, the image/media/POI advertisement content received may be assigned to the overlay object (line 73).

At step 1236, the overlay object may be made visible to the user (line 74). At step 1238, additional functionality may be added. For example, the overlay object may be repositioned and/or resized with respect to the POI on the map (line 75). An internally-defined variable tracking the visibility of the overlay object may be set to "true" (line 77) to indicate the overlay object is visible.

Figure 12C:
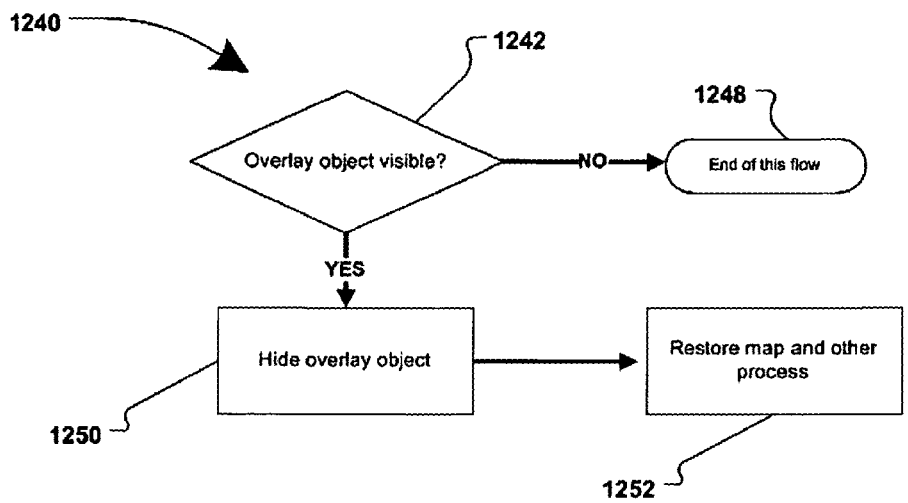

If at step 1224 it is determined the maximum level of the map has not been reached, referring now to FIG. 12C, the logic of flow diagram 1240 may be invoked.

If at step 1242 it is determined an overlay object is visible (line 78) at step 1250 the overlay object may be hidden/made invisible (line 80). At step 1252 other functionality may be invoked to restore the map to its previous state (line 81). An internally-defined variable tracking the visibility of the overlay object may be set to "false" (line 82) to indicate the overlay object is not visible.

If at step 1242 it is determined the overlay object is not visible, at step 1248 the flow of the present invention may end (other functionality, outside the scope of the present invention, may be invoked—e.g. updating routes, traffic information, etc.).

Figure 12D:
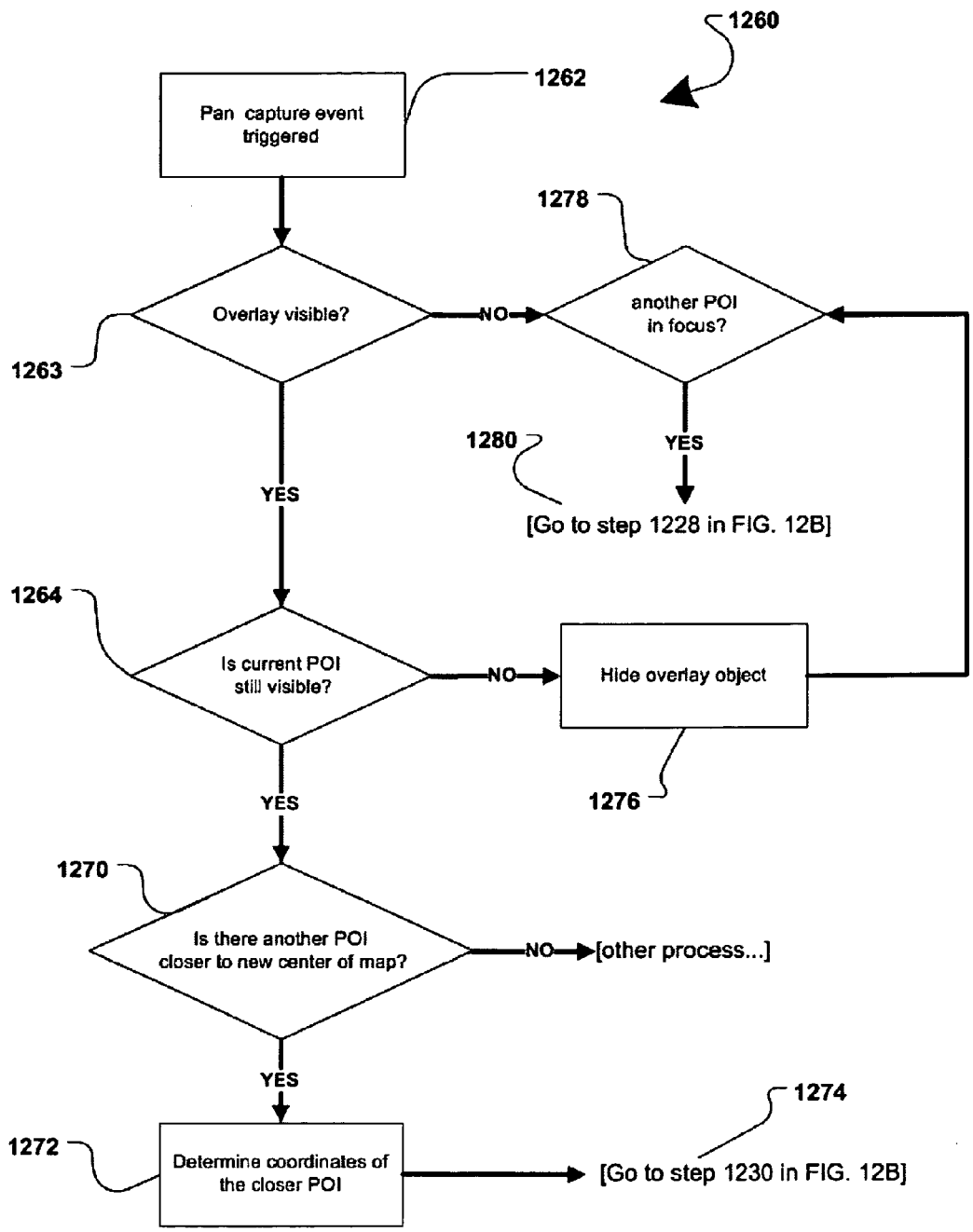

Referring now to FIG. 12D, flow diagram 1260 illustrates logic for handling pan events (for example, the logic of function "POIContentZoom ( )" defined in line 43 to be automatically invoked in response to a pan event.)

At step 1262, a pan event-handling function (e.g. "POI-ContentZoom 0") is called in response to a pan event. If at step 1263 it is determined the overlay object is visible, steps 1264-1274 may be executed.

If at step 1264 it is determined the current POI (i.e. the POI associated with the POI advertisement content displayed in the overlay object) is visible, at step 1270 it may be determined whether another POI ("new POI") on the visible map is closer to the new center of the map than the current POI. If a new POI is determined at step 1270, at step 1272 information on the new POI is obtained (e.g. coordinates, name, etc.) and at step 1274, step 1230 in FIG. 12B may be invoked to display POI advertisement content associated with the new POI. If at step 1270 it is determined no new POI exists, flow 1260 may terminate.

If at step 1264 it is determined the current POI is not visible on the map, at step 1276 the overlay object may be terminated (e.g. hidden from view, unloaded from memory, etc.)

Following step 1276—or if at step 1263 it is determined no overlay is visible—at step 1278 it may be determined whether another POI is in focus. If it is determined at step 1278 another POI is in focus, step 1228 in FIG. 12B may be invoked to display new POI advertisement content associated with the other POI determined to be in focus at step 1278.

The flow diagrams depicted in FIGS. 12A-12D, and any associated computer code listed, are examples of one way of implementing the present invention—many other implementations, logical flows and code are possible without departing from the spirit of the invention. Yahoo! Maps® API was chosen for illustrative purposes only and other mapping services' APIs may be used with minor modification to the code illustrated here.

Figure 13:
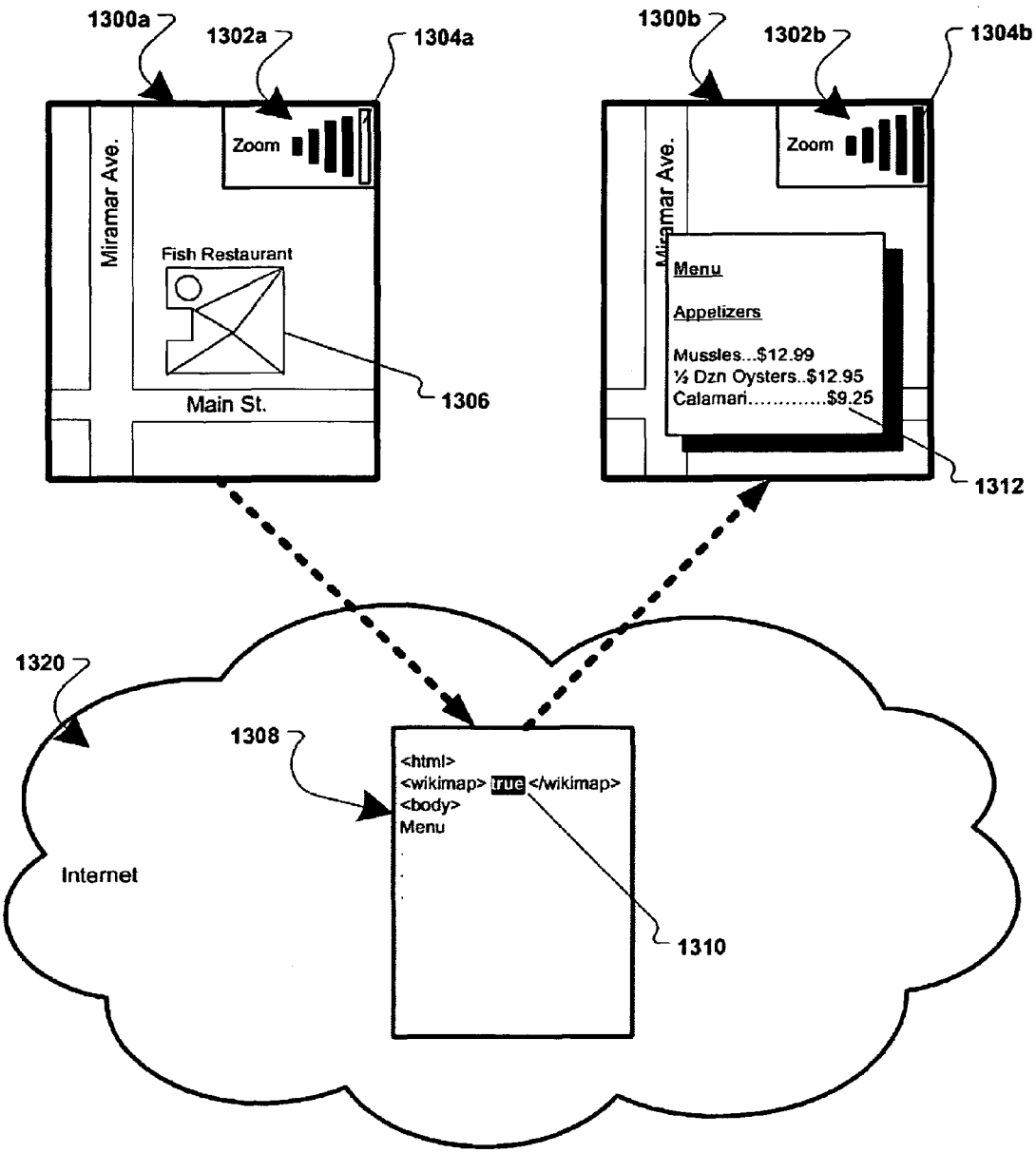
FIG. 13 is a generalized block diagrams illustrating retrieving POI advertisement content from web sties associated with points of interest ("POI") on a map, according to one possible embodiments

FIG. 13 is a generalized block diagrams illustrating retrieving POI advertisement content from web sties associated with points of interest ("POI") on a map, according to one possible embodiments of the present invention. POIs appearing on a map (e.g. stores, restaurants, attractions, etc.) commonly have associated web sites on the world-wide web. A web site usually consists of one or more web pages, one of which is common landing page. For example, the US PTO office at 600 Dulany St., Alexandria, Va. 22314 may be marked on a map as a result of a search. The US PTO's website, www.uspto.gov may be obtained as part of the result-set of the same search.

In present mapping technologies, a link may exist between a POI on a map and a web site associated with the POI. For example, searching for the term "pizza" in a city, on Google Maps®, may display markers in all locations where pizza restaurants were found. Clicking on a marker displays standardized information about the POI, such as link to a website, address, links to reviews, links to driving directions, links to contacting the POI, etc.

Please note that in FIG. 13, one map-display application is shown in two phases: as map-display application 1300*a* and then as map-display application 1300*b*. Items related to the map-display application are labeled 1302*a* and 1304*a* when displayed in conjunction with one phase of the map display application 1300*a*. When displayed in conjunction with the second phase 1300*b* of the map-display application, the items above are labeled 1302*b*, 1304*b*, respectively.

Map-display application 1300*a* may display a map containing a POI 1306. Map-display application 1300*a* may also display a zoom control 1302*a*. (In this example, zoom control 1302*a* may display a series of bars to indicate the current zoom level. The right-most and largest bar 1304*a* is not colored, indicating the highest zoom level has not been reached.)

Once the map in map-display application 1300*b* has been zoomed in to the maximum level (e.g. as indicated by zoom control 1302*b* where the right-most bar 1304*b* is in solid color) POI advertisement content 1312, associated with the POI 1306, may be displayed.

In this example, POI 1306 is a restaurant and the associated POI advertisement content 1312 is the restaurant's menu. In other examples POI 1306 may be any type of business and the associated POI advertisement content 1312 may be any text, image, media, etc. associated with the POI 1306.

POI advertisement content 1312 may reside in a web page 1308 on the world-wide web 1320. In other possible embodiments, POI advertisement content 1312 may reside elsewhere on the world-wide web 1320 and be pointed to from web page 1308 (ex. via a hyperlink.)

In yet another possible embodiment, web page 1308 may contain a tag (for example <wikimap>true</wikimap> 1310) indicating to map-display application 1300b that content on, and/or pointed-to from, web page 1308 is to be used as POI advertisement content 1312. In such embodiment, a business may tag a web page with a pre-determined tag, indicating to map-display applications that a tagged web page is to be displayed as POI advertisement content.

For example, a restaurant may add a web page to its website containing POI advertisement content, such as a menu. That web page may be tagged with a pre-determined tags (e.g. <wikimap>true</wikimap> 1310) indicating to map-display applications that POI advertisement content is contained in that web page. When a map displaying a POI 1306 is zoomed to/past the highest-zoom level, map-display application 1300a may search the world-wide web 1320 for a website associated with the POI 1306. The website may then be searched for a web page tagged as the POI advertisement content-containing page 1308, and the content in the webpage 1308 may then be displayed by the map-display application 1300b as POI advertisement content 1312. (In this example, the restaurant's menu is the POI advertisement content.)

In alternate embodiments, other methods may be used to allow businesses to provide their individual POI advertisement content for display when a map showing their business is zoomed into POI advertisement content-display mode.

Figure 14A:
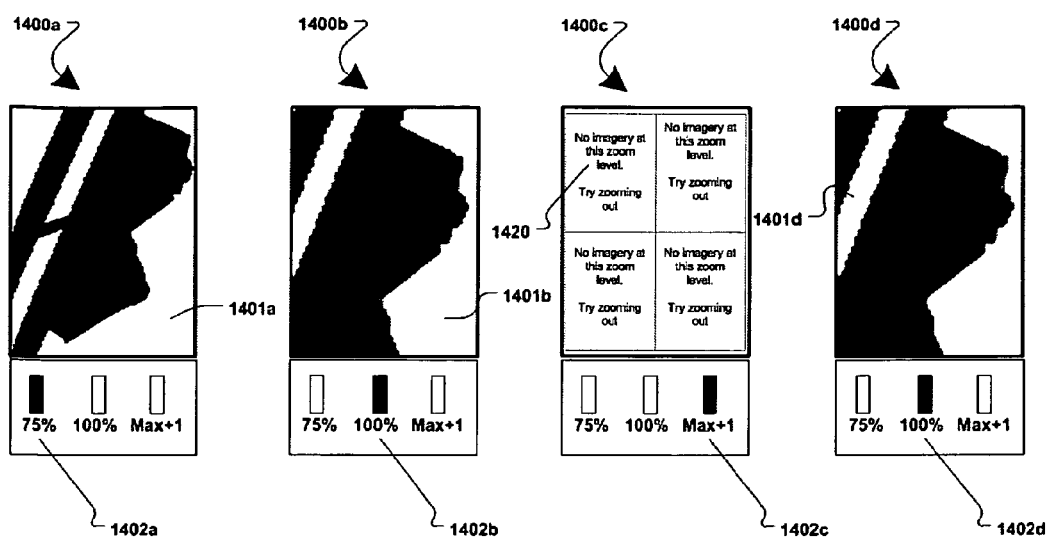
FIGS. 14A and 14B are generalized block diagrams illustrating retrieving and displaying POI advertisement content from a mapping server, according to one possible embodiments of the present invention.
Figure 14B:
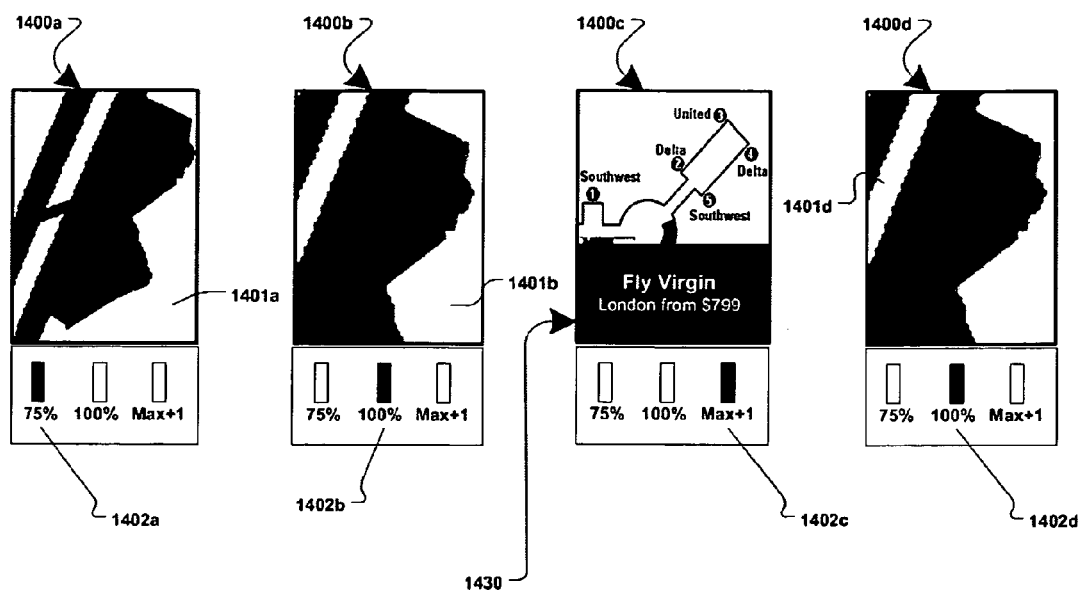

FIGS. 14A and 14B are generalized block diagrams illustrating retrieving and displaying POI advertisement content from a mapping server, according to one possible embodiments of the present invention. At present, client-sided map-display applications obtain mapping data from mapping servers. Maps are composed of graphical images, known as "map tiles", that are transmitted from a mapping server, and assembled and displayed as a map a map-display application.

Map tiles of a geographic region not supported by a certain zoom level are often blank (i.e. show no geographic data other than text, such as "we are sorry but we don't have imagery at this zoom level for this region. Try zooming out for a broader look.")

Referring to FIG. 14A, a four-phase sequence is shown where a map-display application is shown in four different phases at different zoom levels. In each phase, map tiles are retrieved from the mapping server (or local cache if a map tile had already been retrieved from the mapping server and saved locally) and are stitched together to form a map.

In the first phase, map-display application 1400a may display a map 1401a (e.g. an aerial view of an airport) at a zoom level corresponding to 75% of the maxim zoom level (as shown by zoom indicator 1402a "75%".)

In the second phase, map-display application 1400b may display a zoomed-in map 1401b (e.g. the same airport in map 1401a but shown in a higher zoom level) at a zoom level corresponding to 100% of the maxim zoom level (as shown by zoom indicator 1402b "100%".)

In the third phase, in accordance with the methodology used in prior art, in response to a user's "zoom-in" command past the highest-supported zoom level (as illustrated by zoom indicator 1402c "Max+1" to indicate a zoom level exceeding the normal maximum zoom level of the map.) the mapping server may return blank map tiles 1420 (commonly notifying the user, in plain text, that no imagery is available at the present zoom level.)

In the fourth phase, in response to a user's "zoom out" command, map-display application 1400d may display map 1401d (identical to map 1401b) at a 100% zoom level (as shown by zoom indicator 1402d "100%".)

While the sequence shown in FIG. 14A illustrates the operation of prior art (a user zooms-in multiple times, with each increased zoom level showing a closer-up view. At a certain zoom level the user sees blank tiles with text indicating no data is available at that zoom level. The user then realizes they have zoomed in too far, so they zoom out and see map imagery at the highest supported zoom level,) FIG. 14B illustrates a similar sequence benefiting from the art disclosed in the present invention.

Referring now to FIG. 14B, map-display application 1400b may display map 1401b at a 100% zoom level. Let us assume that is the highest zoom-level for which a mapping server can display a map of that region. A subsequent zoom-in command may then display POI advertisement content 1430 (e.g. an airline ad, as in "Fly Virgin, London from $799") A zoom indictor may be labeled "Max+1" 1402c to indicate zooming is past the normal highest zoomable level of the map.

In the presently-preferred embodiment, map tiles at a zoom-level for which no geographic mapping content is available, may be rendered with POI advertisement content by the mapping server. Thus a map-display application on a user's device, requesting map tiles corresponding to a given zoom-level from a mapping server, may receive map imagery at one zoom level, and POI advertisement content at another zoom level.

In alternate embodiments, a map-display application on a user's device, in response to receiving blank map tiles from a mapping server, may then obtain and display POI advertisement content from another source.

The examples above demonstrate the power and flexibility of the present invention in retrieving and displaying POI advertisement content associated with one or more POIs on a map.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of displaying advertisement content on an electronic map displaying geographic content, in response to a zoom-in command on the electronic map, comprising:
   providing an electronic device having a map display application that is coupled to the internet and a display for displaying a selected area of an electronic map;
   providing two types of content: geographic content and advertisement content, wherein the geographic content is comprised of mapping-image tiles;
   selecting a pre-determined zoom level for the geographic content displayed on the electronic map;

anticipating one Point-of-Interest ("POI") in the geographic content that would be visible when the geographic content is displayed at the pre-determined zoom level;
determining a subset of the advertisement content associated with the one POI;
receiving a first set of mapping-image tiles representing the geographic content;
displaying the first set of mapping-image tiles representing the geographic content at a first zoom level;
receiving a first zoom-in command, wherein the first zoom-in command is directed at the selected area of the electronic map;
determining the pre-determined zoom level has not been reached;
receiving a second set of mapping-image tiles representing the geographic content representing the geographic content at a higher level of detail;
displaying the second set of mapping-image tiles;
receiving a second zoom-in command;
determining the pre-determined zoom level has been reached;
receiving the selected subset of the advertisement content, and
displaying the subset of the advertisement content on the display, wherein the subset of the advertising content replaces the second set of mapping-image tiles.

2. The method of claim 1, wherein the zoom-in command is received from an input device.

3. The method of claim 2, wherein the input device is a touch screen programmed to transmit to the map display application a zoom-in command.

4. The method of claim 1, wherein a portion of the mapping-image tiles remain visible on the periphery of the advertisement content on the electronic map.

5. The method of claim 1, wherein the geographic content and the advertisement content are displayed within a web-browsing application.

6. The method of claim 1, wherein in response to receiving an additional zoom-out command or a pan command, the advertisement content is removed from the display.

7. The method of claim 1, wherein in the transmitting information representing the selected area step, GPS coordinates delimiting the selected area are transmitted.

8. The method of claim 1, wherein the steps of receiving the advertisement content for the selected area from the second server and displaying the advertisement content for the selected area on the display, further include:
receiving a first set of advertisement content, wherein the first set of the advertisement content includes information allowing selection of a second set of advertisement content;
displaying the first set of advertisement content to the user;
receiving user input selecting at least some of the first set of advertisement content; and
retrieving and displaying at least some of the second set of advertisement content pertaining to the at least some of the first set of advertisement content selected by the user input.

9. The method of claim 8, wherein the first set of advertisement content includes a way to hyperlink to the second set of advertisement content.

10. The method of claim 1, wherein in the determining if the pre-determined zoom level step has been reached step, the selected zoom level corresponds to a maximum attainable zoom level of the selected area of the electronic map.

11. The method of claim 1, wherein the advertisement content is filtered against a profile of a user using the electronic device.

12. The method of claim 11, wherein the advertisement content is from a social network, and wherein the advertisement content is filtered against a social-network profile of the user.

13. The method of claim 1, wherein the advertising content is derived off a pay-per-click advertising service.

14. A method of substituting advertisement content for geographic content while displaying the geographic content on an electronic map, comprising:
providing two types of content: geographic content and advertisement content, wherein the geographic content is comprised of mapping-image tiles and is one of: a satellite image or a street map comprised of graphical tiles, and wherein the advertisement content resides in an advertisement data source different from a data source providing the geographic content;
selecting a threshold zoom level for the geographic content displayed on the electronic map;
displaying the geographic content;
receiving a first zoom-in command, wherein the first zoom-in command;
determining the threshold zoom level has not been reached;
displaying the geographic content at a greater level of detail;
receiving a second zoom-in command;
determining the threshold zoom level has been reached;
selecting a visible portion of the electronic map that is displayed as result of the zoom-in command;
transmitting information representing the selected visible portion of the electronic map to a service associated with the advertisement data source;
transmitting additional information to the service associated with the advertisement data source including at least one of: geo-location of an electronic device displaying the electronic map, and/or user information of a user logged into the electronic device, and/or content displayed by the electronic device and/or a cookie associated with a web-browsing application on the electronic device and/or at least one point-of-interest ("POI") on the electronic map;
receiving the advertisement content from the service associated with the advertisement data source; and
substituting the advertisement content for at least a portion of the geographic content wherein the advertisement content is displayed as replacement to at least some of the image-mapping tiles within the original confines of the geographic content.

15. The method of claim 14, wherein the selection of the visible portion of the electronic map is performed automatically by the map-display application.

16. The method of claim 14, wherein the at least one POI is displayed on the electronic map overlaying the geographic content prior to displaying the advertisement content.

17. The method of claim 16, wherein information pertaining to the at least one POI is transmitted to the service associated with the advertisement data source prior to receiving the advertisement content.

18. The method of claim 14, wherein the zoom-in command is received via a voice command received by the electronic device.

19. The method of claim 14, wherein the service associated with the advertisement data source provides pay-per-click contextual advertisements.

20. The method of claim 19, wherein the information representing the selected visible portion of the electronic map contains GPS coordinates.

21. The method of claim 14, wherein following the step of transmitting additional information to the service associated with the advertisement data source, the additional information is processed against one or more potential advertisements targeted at various attributes associated with the additional information.

22. The method of claim 21, wherein one advertisement is selected from the one or more potential advertisements, and the one advertisement is transmitted back as the advertisement content.

23. The method of claim 22, wherein one or more business rules are applied to selecting the one advertisement from the one or more potential advertisements, wherein the business rules involve consideration of the additional information.

24. The method of claim 23, wherein the advertisement content is hyperlinked to other online information.

25. The method of claim 14, wherein the service associated with the advertisement data source includes pay-per-click advertising.

26. A method of choosing and displaying advertisement content related to at least one point-of-interest ("POI") displayed on an electronic map, wherein the electronic map is zoomed past a maximum pre-determined-zoom-level, comprising:
   providing an electronic device having a map display application that is coupled to the internet and a display for displaying geographic content on a selected area of the electronic map, wherein the geographic content is comprised of a plurality of mapping-image tiles;
   setting a value for the maximum pre-determined-zoom-level;
   displaying the electronic map at a first zoom level, wherein the first zoom level is one level below the maximum pre-determined-zoom-level;
   receiving a zoom-in command;
   determining the pre-determined-zoom-level has been reached as result of the zoom-in command;
   selecting a visible portion of the electronic map that is displayed as result of the zoom-in command, wherein the visible portion includes at least one POI; and
   transmitting to a service associated with an advertisement data source ("advertisement server") one or more of the following: information defining the at least one POI and/or information on a user of the electronic device and/or information on a geographic area displayed in the visible portion;
   selecting on the advertisement server an advertisement content to be transmitted to the electronic device, wherein the advertisement content is selected via an optimization algorithm from among a pool of potential advertisement content;
   transmitting the selected advertisement content to the electronic device;
   deleting the plurality of the map-image tiles, and displaying the advertisement content on the display.

27. The method of claim 26, wherein the optimization algorithm factors in one or more of the following: the information defining the at least one POI and/or the information on the user of the electronic device and/or the information on the geographic area displayed in the visible portion.

28. The method of claim 27, wherein the optimization algorithm further factors in one or more business rules for targeted advertising.

29. The method of claim 26, wherein the advertisement content is hyperlinked to a secondary source of content.

30. The method of claim 29, wherein the secondary source of content is displayed in response to a click on the hyperlink.

31. The method of claim 26, wherein the electronic device is a smart phone.

* * * * *